US012433945B2

(12) United States Patent
Adelman

(10) Patent No.: US 12,433,945 B2
(45) Date of Patent: Oct. 7, 2025

(54) PEANUT ORAL IMMUNOTHERAPY WITH MAINTENANCE DOSE

(71) Applicant: SOCIÉTÉ DES PRODUITS NESTLÉ S.A., Vevey (CH)

(72) Inventor: Daniel Adelman, Brisbane, CA (US)

(73) Assignee: Société Des Produits Nestlé S.A., Vevey (CH)

( * ) Notice: Subject to any disclaimer, the term of this patent is extended or adjusted under 35 U.S.C. 154(b) by 374 days.

(21) Appl. No.: 16/542,198

(22) Filed: Aug. 15, 2019

(65) Prior Publication Data

US 2020/0054738 A1   Feb. 20, 2020

Related U.S. Application Data

(60) Provisional application No. 62/809,236, filed on Feb. 22, 2019, provisional application No. 62/765,123, filed on Aug. 16, 2018.

(51) Int. Cl.
| | | |
|---|---|---|
| *A61K 39/35* | (2006.01) | |
| *A61K 9/00* | (2006.01) | |
| *A61K 39/00* | (2006.01) | |
| *A61P 37/08* | (2006.01) | |

(52) U.S. Cl.
CPC ............ *A61K 39/35* (2013.01); *A61K 9/0053* (2013.01); *A61P 37/08* (2018.01); *A61K 2039/54* (2013.01); *A61K 2039/545* (2013.01); *A61K 2039/55* (2013.01)

(58) Field of Classification Search
None
See application file for complete search history.

(56) References Cited

U.S. PATENT DOCUMENTS

| | | | |
|---|---|---|---|
| 3,809,767 A | 5/1974 | Sair et al. | |
| 9,198,869 B2 | 12/2015 | Walser | |
| 9,481,716 B2 | 11/2016 | Clark | |
| 9,492,535 B2 | 11/2016 | Walser | |
| 9,815,894 B2 | 11/2017 | O'brien et al. | |
| 9,949,958 B2 | 4/2018 | Forbes | |
| 9,955,718 B2 | 5/2018 | Gillespie | |
| 9,999,600 B2 | 6/2018 | Sosin | |
| 10,064,936 B2 * | 9/2018 | Nadeau ................. A61K 47/46 |
| 10,086,068 B2 | 10/2018 | Walser | |
| 10,266,588 B2 | 4/2019 | Macdonald et al. | |
| 10,278,964 B2 | 5/2019 | Mann et al. | |
| 10,286,018 B2 | 5/2019 | Smith | |
| 10,449,118 B2 | 10/2019 | Walser | |
| D866,320 S | 11/2019 | Bennet et al. | |
| D866,321 S | 11/2019 | Bennet et al. | |
| D866,322 S | 11/2019 | Bennet et al. | |
| 10,512,686 B2 | 12/2019 | Walser | |
| 10,653,773 B2 | 5/2020 | Walser | |
| 10,918,676 B2 | 2/2021 | Raff | |
| 11,141,352 B2 | 10/2021 | Walser et al. | |
| 11,229,673 B2 | 1/2022 | Birchwood | |
| 11,369,676 B2 | 6/2022 | Dilly | |
| 12,016,917 B2 * | 6/2024 | Walser ................. G01N 33/483 |
| 2002/0018778 A1 | 2/2002 | Caplan | |
| 2004/0166123 A1 | 8/2004 | Jacobi | |
| 2004/0234548 A1 | 11/2004 | Caplan | |
| 2008/0317878 A1 | 12/2008 | Li et al. | |
| 2009/0111702 A1 | 4/2009 | Sampson et al. | |
| 2011/0243994 A1 | 10/2011 | Asari et al. | |
| 2012/0164306 A1 | 6/2012 | Girsh | |
| 2013/0090344 A1 | 4/2013 | Thakur et al. | |
| 2014/0093541 A1 | 4/2014 | Clark | |
| 2014/0207105 A1 | 7/2014 | Laulicht et al. | |
| 2014/0271721 A1 * | 9/2014 | Walser ............... G01N 33/6893 424/275.1 |
| 2014/0363470 A1 | 12/2014 | Koppelman et al. | |
| 2016/0030289 A1 | 2/2016 | Walser | |
| 2016/0051593 A1 | 2/2016 | Raff | |
| 2018/0042816 A1 | 2/2018 | Walser | |
| 2018/0200361 A1 | 7/2018 | Simon | |
| 2019/0167785 A1 | 6/2019 | Dilly | |

(Continued)

FOREIGN PATENT DOCUMENTS

| | | | |
|---|---|---|---|
| JP | 2006519187 A | 8/2006 | |
| JP | 2009522258 A | 6/2009 | |

(Continued)

OTHER PUBLICATIONS

Vickery et al. 'Early oral immunotherapy in peanut-allergic preschool children is safe and highly effective.'J Allergy Clin Immunol 2017;139:173-81.*
Bird, A. et al. (2018). "Efficacy and Safety of AR101 in Oral Immunotherapy for Peanut Allergy: Results of ARC001, a Randomized, Double-Blind, Placebo-Controlled Phase 2 Clinical Trial," The Journal of Allergy and Clinical Immunology: In Practice. 6(2):476-485.
Carr, T.F. et al. (Feb. 2019). "Longer-Term Safety and Efficacy Measures of AR101 Oral Immunotherapy for Peanut Allergy: Results From a Phase 3 Follow-On Study," Abstract 776: J. Allergy Clin. Immunol. AB256:Abstracts, 1 page.

(Continued)

*Primary Examiner* — Nora M Rooney
(74) *Attorney, Agent, or Firm* — Morgan, Lewis & Bockius LLP

(57) ABSTRACT

The present disclosure relates to improved oral immunotherapy methods for treating peanut allergy. The disclosure provides methods for treating a subject for a peanut allergy by an oral immunotherapy comprising an up-dosing phase and a maintenance phase. In certain embodiments, the methods comprise non-daily administration to the subject of a maintenance phase dose. In certain embodiments, the methods comprise administering a maintenance phase dose for more than 24 weeks. In other embodiments, the disclosure provides methods for reducing the risk of an allergic adverse event in a subject receiving an oral immunotherapy dosage therapy.

14 Claims, 1 Drawing Sheet

(56) References Cited

U.S. PATENT DOCUMENTS

| | | | |
|---|---|---|---|
| 2019/0175723 A1 | 6/2019 | Walser | |
| 2019/0247444 A1 | 8/2019 | Raff | |
| 2020/0030187 A1 | 1/2020 | Bennett | |
| 2020/0129378 A1 | 4/2020 | Walser | |
| 2020/0230206 A1 | 7/2020 | Matthews | |
| 2020/0368304 A1 | 11/2020 | Birchwood | |
| 2021/0052722 A1* | 2/2021 | Walser | A23L 33/185 |
| 2022/0221468 A1 | 7/2022 | Dilly | |

FOREIGN PATENT DOCUMENTS

| | | | | |
|---|---|---|---|---|
| JP | 2011225525 A | | 11/2011 | |
| JP | 2013505897 A | | 2/2013 | |
| JP | 2013519649 A | | 5/2013 | |
| JP | 2014509606 A | | 4/2014 | |
| WO | 199215285 A1 | | 9/1992 | |
| WO | 2004075875 A1 | | 9/2004 | |
| WO | 2007075171 A1 | | 7/2007 | |
| WO | WO 2009/094717 | * | 8/2009 | A61K 39/39 |
| WO | 2010059534 A2 | | 5/2010 | |
| WO | 2010069595 A1 | | 6/2010 | |
| WO | 2010059534 A3 | | 1/2011 | |
| WO | 2011012990 A2 | | 2/2011 | |
| WO | 2011012990 A3 | | 6/2011 | |
| WO | 2011098499 A1 | | 8/2011 | |
| WO | 2012001074 A2 | | 1/2012 | |
| WO | 2012001074 A3 | | 3/2012 | |
| WO | 2012123759 A1 | | 9/2012 | |
| WO | 2013087119 A1 | | 6/2013 | |
| WO | 2013087837 A1 | | 6/2013 | |
| WO | 2014159607 A1 | | 10/2014 | |
| WO | 2014159609 A1 | | 10/2014 | |
| WO | 2015187736 A1 | | 12/2015 | |
| WO | 2016033094 A1 | | 3/2016 | |
| WO | 2016033094 A9 | | 8/2016 | |
| WO | 2018132733 A1 | | 7/2018 | |
| WO | 2019089978 A1 | | 5/2019 | |
| WO | 2020023925 A1 | | 1/2020 | |
| WO | 2020037151 A1 | | 2/2020 | |
| WO | 2020131917 A1 | | 6/2020 | |
| WO | 2020132341 A1 | | 6/2020 | |
| WO | 2020198024 A1 | | 10/2020 | |
| WO | 2020231843 A1 | | 11/2020 | |
| WO | 2020237181 A1 | | 11/2020 | |

OTHER PUBLICATIONS

Clinical Trial, (Jan. 10, 2019). "PALISADE Follow-on Study (ARC004)," retrieved from https://clinicaltrials.gov/ct2/show/NCT02993107?term=ARC004&rank=1, last visited Feb. 17, 2019, 5 pages.
Fernández-Rivas, M. et al. (Jun. 6-8, 2020) "PALISADE Follow-On Study (ARC004): Longer-Term Outcomes With AR101 Oral Immunotherapy for Peanut Allergy," Poster 1393, EAACI Digital Congress, 1 page.
Jones, S.M. et al. (Mar. 4, 2018). "Efficacy and Safety of AR101 in Peanut Allergy: Results from a Phase 3, Randomized, Double-Blind, Placebo-Controlled Trial (PALISADE)," Late-Breaking Abstract Sessions, AAAAI-WAO Joint Congress, Orlando. The Journal of Allergy and Clinical Immunology 141(2):AB412-AB414. Abstract L6, 14 pages.
Prescott, K. et al. (Mar. 2-5, 2018). "Exploration of Non-Daily Maintenance Dosing Regimens in Peanut Oral Immunotherapy," Scientific Abstract Sessions, AAAAI-WAO Joint Congress, Orlando. The Journal of Allergy and Clinical Immunology Abstract 772,141(2):AB294-AB361, 1 page.
Varshney, P. et al. (Mar. 2011). "A Randomized Controlled Study Of Peanut Oral Immunotherapy (OIT): Clinical Desensitization And Modulation Of The Allergic Response," J. Allergy Clin. Immunol. 127(3):654-660, 18 pages.
Vickery, B.P. et al. (Jan. 2013). "Peanut Oral Immunotherapy Modifies IgE and IgG4 Responses To Major Peanut Allergens," J. Allergy Clin. Immunol. 131(1):128-134.e3, 16 pages.

Vickery, B.P. et al. (Nov. 22, 2018). "AR101 Oral Immunotherapy for Peanut Allergy," The New England Journal of Medicine 379(21):1991-2001.
Adelman, D.C. (Oct. 17, 2018). "Efficacy and Safety of AR101 in Peanut Allergy: Resultsfrom a Phase 3, Randomized, Double-Blind Placebo Controlled Trial (PALISDAE), " InternationalFood Allergy & Anaphylaxis Alliance (IFAAA) Meeting, Copenhagen, Denmark, 23 pages.
Altschul, A.S. et al. (Sep. 2001). "Manufacturing and Labeling Issues For Commercial Products: Relevance To Food Allergy," J. Allergy Clin. Immunol. 108(3):468, 1 page.
Anagnostou, K. et al. (2011). "Efficacy and Safety Of High-Dose Peanut Oral Immunotherapy With Factors Predicting Outcome," Clinical & Experimental Allergy, 41:1273-1281.
Anagnostou, K. et al. (Apr. 12, 2014, e-pub. Jan. 30, 2014). "Assessing The Efficacy Of Oral Immunotherapy For The Desensitization Of Peanut Allergy In Children (Stop II): A Phase 2 Randomized Controlled Trial," The Lancet 383(9925):1297-1304.
Ballmer-Weber B.K. et al. (2015). "IgE Recognition Patterns In Peanut Allergy Are Age Dependent: Perspectives Of The Europrevall Study," Allergy 70:391-407.
Bernard, H. et al. (2007, e-pub. Oct. 20, 2007). "Identification Of A New Natural Ara h6 Isoform and Of Its Proteolytic Product As Major Allergens In Peanut," J. of Agricultural and Food Chem. 55(23):9663-9669.
Beyer, K et al. (Oct. 19, 2018). "Adrenaline Use and Reaction-Severity During the ExitDouble-Blind, Placebo-Controlled Food Challenge (DBPCFC) with Peanut in Subjects Aged 4-17 Years in PALISADE, a Phase 3, Randomised, Double-Blind, Placebo-Controlled Trial, "presented at the Food Allergy and Anaphylaxis Meeting (FAAM), Copenhagen Denmark, 13 pages.
Blumchen, K. et al. (Jul. 2010). "Oral Peanut Immunotherapy In Children With Peanut Anaphylaxis," J Allergy Clin Immunol. 126(1):83-91.
Bock, S.A. et al. (Dec. 1988). "Double-Blind, Placebo-Controlled Food Challenge (DBPCFC) As An Office Procedure: A Manual," J Allergy Clin Immunol. 82(6):986-997.
Bock, S.A. et al. (Jan. 2001). "Fatalities Due To Anaphylactic Reactions To Foods," J Allergy Clin. Immunol. 107 (1):191-193.
Bock, S.A. et al. (Oct. 1990). "Patterns Of Food Hypersensitivity During Sixteen Years Of Double-Blind, Placebo-Controlled Food Challenges," J Pediatr. 117(4):561-567.
Bollinger, M.E. et al. (Mar. 2006). "The Impact of Food Allergy On The Daily Activities of Children and Their Families," Ann. Allergy Asthma Immunol. 96(3):415-421. Abstract Only, 2 pages.
Bousquet, J. (2004). "Chapter 6—Primary and Secondary Prevention Of Allergy And Asthma By Allergen Therapeutic Vaccines," in Allergens and Allergen Immunotherapy 18:105-114.
Boyce, J.A. et al. (Dec. 2010). "Guidelines For the Diagnosis and Management Of Food Allergy In The United States: Report Of The NIAID-Sponsored Expert Panel," J. Allergy and Clinical Immunology 126(6):S1-S58.
Buchanan, A.D. et al. (Jan. 2007). "Egg Oral Immunotherapy In Nonanaphylactic Children With Egg Allergy," J. Allergy Clin. Immunol. 119:199-205.
Burks, A.W. (2009). "Early Peanut Consumption: Postpone Or Promote?," J. Allergy Clin.Immunol. 123(2):424-425.
Burks, A.W. et al. (Jul. 19, 2012). "Oral Immunotherapy for Treatment of Egg Allergy in Children," N. Engl. J. Med. 3673:233-243.
Burks, W. (2004). "Chapter 17: Food Allergens," Clin. Allergy Immunol. 18:319-337.
Burks, W. (American Academy of Allergy, Asthma, and Immunology National Conference. Orlando, Florida, Mar. 6, 2012). 2012 American Academy of Allergy, Asthma & Immunology Annual Meeting. "Food Allergy" "Oral Immunotherapy for Food Allergens" "Food Allergy Guidelines" "Oral Desensitization in Patients with Food Allergy" Orlando, FL Mar. 2012, 109 pages.
Burks, W. (Apr. 2003). "Peanut Allergy: A Growing Phenomenon," J. Clin. Invest. 111(7):950-952.
Burks, W. (Dec. 2000). "Diagnosis Of Allergic Reactions To Food," Pediatr. Ann. 29:744-752.

(56) References Cited

OTHER PUBLICATIONS

Burks, W. (Jun. 2003). "Skin Manifestations Of Food Allergy," Pediatrics 111(6):1617-1624.
Burks, W. (May 2002). "Current Understanding Of Food Allergy," Ann. NY. Acad. Sci. 964:1-12.
Burks, W et al. (1998). "Review Article Series II: Peanut Allergens," Allergy 53:725-730.
Careri, M. et al. (2007, e-pub. Sep. 27, 2007). "Use Of Specific Peptide Biomarkers For Quantitative Confirmation Of Hidden Allergenic Peanut Proteins Ara h 2 and Ara h 3/4 For Food Control By Liquid Chromatography-Tandem Mass Spectrometry," Anal. Bioanal. Chem. 389(6):1901-1907.
Chan, C. et al. (2018). "Current Trend in Immunotherapy for Peanut Allergy," Int. Reviews of Immunology 37(6) 279-290.
Chassaigne, H. et al. (2007, e-pub. May 3, 2007). "Proteomics-Based Approach To Detect and Identify Major Allergens in Processed Peanuts by Capillary LC-Q-TOF (MS/MS)," J. of Agricultural and Food Chemistry 55:4461-4473.
Chen, X. et al. (2013, e-pub. Oct. 16, 2012). "Ara h2 and Ara h6 Have Similar Allergenic Activity and Are Substantially Redundant," International Archives Of Allergy and Immunology 160:251-258.
Christensen, L.P. et al. (1995). "A Simple HPLC Method For The Isolation and Quantification of the Allergens Tuliposide A and Tulipalin A in Alstroemeria," Contact Dermatitis 32:199-203.
Chu, D. et al. (Jun. 1, 2019, e-pub. Apr. 25, 2019). "Oral Immunotherapy for Peanut Allergy (PACE): A Systematic Review and Meta-Analysis of Efficacy and Safety," Lancet 393:2222-2232.
Clark, A.T. et al. (2009). "Successful Oral Tolerance Induction In Severe Peanut Allergy," Allergy 64:1218-1220.
Clark, A.T. et al. (Aug. 2003). "Interpretation Of Tests For Nut Allergy In One ThousandPatients, In Relation To Allergy Or Tolerance," Clinical and Experimental Allergy 33(8):1041-1045.
Clinical Trial (Jul. 17, 2018). "Oral Desensitization to Peanut in Peanut-Allergic Children and Adults Using Characterized Peanut Allergen OT (ARC001)," NCT01987817, 7 pages.
Curatolo, W. et al. (2011, e-pub. Feb. 18, 2011). "Effects of Food on a Gastrically Degraded Drug: Azithromycin Fast-Dissolving Gelatin and HPMC Capsules," Pharmaceutical Research 28(7):1531-1539.
Davis, C.M. et al. (Feb. 2018). "Peanut Oil Immunotherapy Threshold Dose for Reactivity: What is the Upper Limit?" J. Allergy Clin. Immunol. AB246 Abstract—775, 1 page.
De Oliveira, L.C.L. et al. (2013). "The Value of Specific IgE to Peanut and Its Component Arah 2 in the Diagnosis of Peanut Allergy," J. Allergy Clin. Immunol. 1(4):394-398.
Donelson, S. et al. (Feb. 2020). "Peanut Allergy Burden Survey: Comparison of Responses From Adolescents and Caregivers of Adolescents," J. Allergy Clin. Immunol. Abstract # 468, AB146 Abstracts, 1 page.
Du Toit, G. et al. (May 2018). "Efficacy and Safety of AR101 in Peanut Allergic Patients Aged 4-55: Results from an International Phase 3, Randomised, Double-Blind, Placebo ControlledTrial (PALISADE)," presented at the European Academy of Allergy and Clinical Immunology (EAACI), Munich, Germany, 12 pages.
Dunnglavin, A. et al. (Feb. 23, 2019). "163: APPEAL (Allergy to Peanuts Impacting Emotions and Life): Pan-European Results on Peanut Allergy Impact on Allergic Individuals, Parents and Caregivers," American Academy of Allergy Asthma & Immunology 2019 Annual Meeting, 1 pages.
Epstein-Rigbi, N. et al. (Feb. 2019). "Quality of Life of Food Allergic Patients Before, During, and After Oral Immunotherapy," J of Allergy and Clinical Immunology: In Practice 7(2)429-436.
Fiocchi, A. et al. (Jul. 2006). "Food Allergy and The Introduction Of Solid Foods To Infants: A Consensus Document," Ann. Allergy Asthma Immunol. 97:10-21.
Flinterman, A.E. et al. (2006). "Determination Of No-Observed-Adverse-Effect Levels and Eliciting Doses In A Representative Group Of Peanut-Sensitized Children," Journal of Allergy and Clinical Immunology 117(2):448-454.
Flinterman, A.E. et al. (2007). "Children With Peanut Allergy Recognized Predominantly Ara h2 and Ara h6, Which Remains Stable Over Time," Clin. Exp. Allergy 37:1221-1228.
Frew, A.J. (2003). "25. Immunotherapy Of Allergic Disease," J. Allergy Clin. Immunol. 111(2 Suppl): S712-S719.
Fu, T.J. et al. (Jun. 19, 2013, e-pub. Apr. 8, 2013). "Impacted of Thermal Processing on ELISA Detection of Peanut Allergens," J. Agric. Food. Chem. 61(24):5649-5658.
Fung, I. et al. (Jan. 8, 2013). "Relating Microarray Component Testing and Reported Food Allergy and Food-Triggered Atopic Dermatitis: A Real-World Analysis," Annals of Allergy, Asthma & Immunology, 110(3):173-177.
Galvin, A.D. et al. (2022). "Summary of Society's Guidelines For Authors," European Academy of Allergy & Clinical Immunology 2022 EAACI Hybrid Congress, 4 pages.
Galvin, A.D. et al. (Apr. 7, 2022). Children and Caregiver Proxy Quality of Life From Peanut Oral Immunotherapy Trials, Manuscript, 48 pages.
Grimshaw, K.E.C. et al. (2015). "Incidence and risk Factors For Food Hypersensitivity In UK Infants: Results From A Birth Cohort Study," Clin Transl Allergy 6:1, 13 pages.
Gugiu, P. et al. (Mar. 18, 2020). "One Ruler to Measure Them All: Combine Data From Multiple Forms," Clinical Outcomes, pp. 1-4.
Hofmann, A.M. et al. (Aug. 2009). "Safety of A Peanut Oral Immunotherapy Protocol In Children With Peanut Allergy," J. Allergy Clin. Immunol. 124:286-291, 14 pages.
Hourihane, J.O. et al. (2019). "OA0166—Improvements in Disease-Specific Quality of Life for Peanut-Allergic Subjects Receiving AR101 Maintenance Therapy," European Journal of Allergy and Clinical Immunology, Abstract, 1 page.
Hourihane, J.O. et al. (Jun. 1997). "Clinical Characteristic Of Peanut Allergy," Clinical and Experimental Allergy 27 (6):634-639.
Hourihane, J.O. et al. (Sep. 30-Oct. 2, 2018) "Abstract OP.091: Efficacy and Safety Of AR101: Results Of The Phase 3 Peanut Allergy Oral Immunotherapy Study For Desensitization (PALISADE) Trial," Abstracts, 2018 Annual Meeting of the British Society for Allergy and Clinical Immunology, 121 pages.
Jones, S.M. et al. (2014). "State Of The Art On Food Allergen Immunotherapy: Oral, Sublingual, and Epicutaneous," J. Allergy Clin. Immunol. 133(2):318-323.
Jones, S.M. et al. (Aug. 1, 2009). "Clinical Efficacy and Immune Regulation With Peanut Oral Immunotherapy," Journal of Allergy and Clinical Immunology 124(2):292-300.
Jones, S.M. et al. (Aug. 2009). "Clinical Efficacy and Immune Regulation With Peanut Oral Immunotherapy," J. Allergy Clin. Immunol. 124(2):292-300 with Supplemental Information, 106 pages.
Jones, S.M. et al. (Aug. 2009). "Clinical Efficacy and Immune Regulation With Peanut Oral Immunotherapy," J. Allergy Clin. Immunol. 124(2):292-30197, 20 pages.
Joshi, P.S. et al. (2002). "Interpretation Of Commercial Food Ingredient Labels By Parents Of Food-Allergic Children," J. Allergy Clin. Immunol. 109(6):1019-1021.
Kapsenberg, M.L. et al. (Jun. 1999). "The Paradigm Of Type 1 and Type 2 Antigen-Presenting Cells. Implications For Atopic Allergy," Clin. Exp. Allergy 29(Suppl. 2):33-36.
Kim, E.H. et al. (Mar. 2011). "Sublingual Immunotherapy For Peanut Allergy: Clinical and Immunologic Evidence Of Desensitization," J. Allergy Clin. Immunol. 127(3):640-646, 19 pages.
King, R.M. et al. (2009). "Impact of Peanut Allergy On Quality of Life, Stress and Anxiety In The Family," Allergy, 64 (3):461-468, 31 pages.
Koid, A. et al. (Jan. 8, 2014). "Ara h 6 Complements Ara h 2 As An Important Marker For IgE Reactivity To Peanut," J. Agric. Food Chem. 62(1):206-213, 18 pages.
Koppelman et al. (Feb. 19, 1999). "Heat-Induced Conformational Changes of Ara h 1, A Major Peanut Allergen, Do Not Affect Its Allergenic Properties," J. Biol. Chem. 274(8):4770-4777.
Koppelman, S et al. (2012). "Abstract 1463—The Content of Allergens Arah1, Arah2, Ara h3, and Ara h6 in Different Peanut Cultivars Commonly Consumed in Europe and the USA," Allergy 67(Suppl. 96):548.

(56) References Cited

OTHER PUBLICATIONS

Koppelman, S.J. et al. (2001). "Quantification Of Major Peanut Allergens Ara h1 and Ara h2 In The Peanut Varieties Runner, Spanish, Virginia, and Valencia, Bred In Different Parts Of the World," Allergy 56:132-137.
Koppelman, S.J. et al. (2004). "Relevance Of Ara h1, Ara h2, and Ara h3 In Peanut Allergic Patients, As Determined By Immunoglobulin E Western Blotting, Basophil-Histamine Release, and Intracutaneous Testing: Ara h2 Is The Most Important Peanut Allergen," Clin. Exp. Allergy 34:583-590.
Koppleman, S.J. et al. (2010). "Digestion Of Peanut Allergens Ara h1, Ara h3 and Ara h6: A Comparative In Vitro Study and Partial Characterization Of Digestion-Resistant Peptides," Molecular Nutrition and Food Research 54:1711-1721.
Krieg, A.M. et al. (Apr. 6, 1995). "CpG Motifs In Bacterial DNA Trigger Direct B-Cell Activation," Nature 374:546-549.
Krimpenfort et al. (1988). "Transcription Of T Cell Receptor β-Chain Genes Is Controlled By A Downstream Regulatory Element," EMBO J. 7(3):745-750.
Kulis, et al. (Feb. 2012). The 2S Albumin Allergens of Archis Hypogaea, Ara h 2 and Ara h 6, are the Major Elicitors of Anaphylaxis and Can Effectively Desensitize Peanut-Allergic Mice, Clinical & Experimental Allergy: Journal of British Society for Allergy and Clinical Immunology 42(2):326-336, 18 pages.
Lehmann, K. et al. (2006). "Structure and Stability of 2S Albumin-Type Peanut Allergens: Implications For The Severity Of Peanut Allergic Reactions," Biochem. J. 395:463-472.
Lehrer, S.B. et al. (1999). "Immunotherapy For Food Allergies. Past, Present, Future," Clin. Rev. Allergy Immunol. 17(3):361-381.
Maloney, J.M. et al. (Jul. 2008, e-pub. May 27, 2008). "The Use Of Serum-Specific IgE Measurements For The Diagnosis Of Peanut, Tree Nut, and Seed Allergy," Journal of Allergy and Clinical Immunology 122(1):145-151.
Michaud, E. et al. (Apr. 29, 2015). "Peanut Oral Immunotherapy in Adolescents: Study Protocol For a Randomized Controlled Trial," Trials 16(1):197, 6 pages.
Mondoulet et al. (Feb. 21, 2012). "Epicutaneous Immunotherapy (EPIT) Blocks the Allergic Esophago-Gastro-Enteropathy Induced by Sustained Oral Exposure to Peanuts in Sensitized Mice," Plos One 7(2):e31967, 10 pages.
Morishita M. et al. (Oct. 2006). "Is The Oral Route Possible For Peptide and Protein Drug Delivery?" Drug Discovery Today 11(19/20):905-910.
Moutete, H.F. et al. (1995)."Purification Of Allergenic Proteins From Peanut For Preparation Of The Reactive Solid Phase Of A Specific IgE Radioimmunoassay," J. Chromatograph. B. 664:211-217.
Muheem, A. et al. (2014). "A Review On The Strategies For Oral Delivery Of Proteins and Peptides and Their Clinical Perspectives," Saudi Pharmaceutical Journal, 16 pages.
Narisety, S.D. et al. (Sep. 2009). "Open-Label Maintenance After Milk Oral Immunotherapy For IgE-Mediated Cow's Milk Allergy," J. Allergy Clin. Immunol. 124(3):610-612, 6 pages.
Nelson, H.S. et al. (1997). "Treatment Of Anaphylactic Sensitivity To Peanuts By Immunotherapy With Injections Of Aqueous Peanut Extract," J. Allergy Clin. Immunol. 99(6 Pt 1):744-751.
Nicolaou, N. et al. (Jan. 2010). "Allergy Or Tolerance In Children Sensitized To Peanut: Prevalence and Differentiation Using Component-Resolved Diagnostics," J. Allergy Clin. Immunol. 125:191-197.
Nowak-Wegrzyn, A. et al. (Feb. 2020). "Peanut Allergy Burden Survey: Impact of Peanut Allergy on Global Quality of Life in Adolescent Patients," J. Allergy Clin. Immunol. Abstract # 466, AB146 Abstracts, 1 page.
Ohayon, J. et al. (Feb. 2020). "Improvements in Self-Reported Disease-Specific Quality of Life Among Peanut-Allergic Subjects Receiving AR101 for 28 or 56 Weeks Beyond the First Year of Treatment," J. Allergy Clin. Immunol. Abstract # 432, AB136 Abstracts, 1 pages.
Oppenheimer, J.J. et al. (1992). "Treatment Of Peanut Allergy With Rush Immunotherapy," J. Allergy Clin. Immunol. 90(2):256-262.

O'Connell. (2012). "Uses Of Sieves In The Pharmaceutical Industry and The Increased Demand For Containment," International Pharmaceutical Industry 4(4):88-90.
Pajno, G.B. et al. (2014). "Oral Immunotherapy for Treatment of Immunoglobulin E-Mediated Food Allergy: The Transition to Clinical Practice," Pediatr Allergy Immunol Pulmonol. 27(2):42-50.
Peeters, K.A.B.M. et al. (2007). "Does Skin Prick Test Reactivity To Purified Allergens Correlate With Clinical Severity Of Peanut Allergy?" Clinical and Experimental Allergy 37:108-115.
Pele, M. (2010). "Peanut Allergens," Romanian Biotechnological Letters 15(2):5204-5212.
Pingali, K. et al. (May 16, 2011, e-pub. Feb. 26, 2011). "Mixing Order Of Glidant and Lubricant—Influence On Powder and Table Properties," Int. J. Pharm. 409:269-277, 22 pages.
Pisetsky, D.S. (Oct. 1996). "Immune Activation by Bacterial DNA: A New Genetic Code," Immunity 5:303-310.
Podczek, F. et al. (1999). "The Filling Of Granules Into Hard Gelatin Capsules," International Journal of Pharmaceutics 188(1):59-69.
Poms, R.E. et al. (2004). "Effect Of Roasting History and Buffer Composition On Peanut Protein Extraction Efficiency," Mol. Nutr. Food Res 48:459-464.
Porterfield, H.S. et al. (Jul. 2009). "Effector Activity Of Peanut Allergens: A Critical Role For Ara h2, Ara h6 and Their Variants," Clin. Exp. Allergy 39(7):1099-1108, 19 pages.
Project Code (2020). "Devising and Testing a Scoring Algorithm For The Food Allergy Quality of Life Questionnaire (FAQLQ) Across Multiple Forms," Clinical Outcomes pp. 1-3.
Publication Information for Burman, J. et al. (2018). "High Arachis Hypogaea Allergen 2 Immunoglobulin E Levels Predict Responses To Exposure To A Small Amount Of Peanut Protein," Acta Paediatrica 107:2216, retrieved from Internet https://onlinelibrary.wiley.com/doi/abs/10.1111/apa.14511, last visited Feb. 7, 2021.
Rancé, F. et al. (Jun. 2002). "Improved Screening For Peanut Allergy By The Combined Use Of Skin Prick Tests And Specific IgE Assays," Journal of Allergy and Clinical Immunology 109(6):1027-1033.
Roberts, G. et al. (Jun. 2005). "Diagnosing Peanut Allergy With Skin Prick and Specific IgE Testing," J. Allergy Clin. Immunol. 115:1291-1296.
Salvilla, S.A. et al. (May 16, 2014). "Disease-Specific Health-Related Quality of Life Instruments for IgE-Mediated Food Allergy," Allergy 69:834-844.
Sampson, H. A. et al. (2011). "A Phase II, Randomized, Double Blind, Parallel Group, Placebo Controlled Oral Food Challenge Trial of Xolair (omalizumab) in Peanut Allergy," J. Allergy Clin. Immunol. 127(5):1309-1310.
Sampson, H.A. et al. (1997). "Clinical Aspects Of Allergic Disease: Relationship Between Food-Specific IgE Concentrations and The Risk Of Positive Food Challenges In Children and Adolescents," J. Allergy Clin. Immunol. 100 (4):444-451.
Sampson, H.A. et al. (2005). "Symposium On The Definition And Management Of Anaphylaxis: Summary Report," J. Allergy Clin. Immunol. 115(3):584-591.
Santos, A.F. et al. (Sep. 2014). "Food, Drug, Insect Sting Allergy, and Anaphylaxis: Basophil Activation Test Discriminates Between Allergy and Tolerance In Peanut-Sensitized Children," J. Allergy Clin. Immunol. 134:645-652.
Schmitt, D.A. et al. (2010, e-pub. Dec. 22, 2009). "Processing Can Alter the Properties Of Peanut Extract Preparations," J. Agric. Food Chem. 58:1138-1143.
Schneider, L.C. et al. (2013, e-pub. Oct. 28, 2013). "A Pilot Study of Omalizumab to Facilitate Rapid Oral Desensitization in High-Risk Peanut-Allergic Patients," J. Allergy Clin. Immunol. 132:1368-1374.
Schurlock, A.M. et al. (Nov. 1, 2004). "Peanut Allergenicity," Annals of Allergy, Asthma & Immunology 93(5): S12-S18.
Secrist, H. et al. (Mar. 1995). "Interleukin 4 Production By CD4+ T Cells From Allergic Individuals Is Modulated By Antigen Concentration and Antigen-Presenting Cell Type," J. Exp. Med. 181(3):1081-1089.

(56) References Cited

OTHER PUBLICATIONS

Sen, M. et al. (2002). "Protein Structure Plays a Critical Role In Peanut Allergen Stability and May Determine Immunodominant IgE-Binding Epitopes," The Journal Of Immunology 169:882-887.
Shreffler, W.G. et al. (Apr. 2004). "Microarray immunoassay: Association Of Clinical History, in vitro IgE Function, and Heterogeneity Of Allergenic Peanut Epitopes," J. Allergy Clin. Immunol. 113(4):776-782.
Sicherer, S.H. (2011, e-pub. Jan. 13, 2011). "Epidemiology Of Food Allergy," J. Allergy Clin. Immunol. 127 (3):594-602.
Sicherer, S.H. (Nov. 1999). "Food Allergy: When and How To Perform Oral Food Challenges," Pediatr. Allergy Immunol. 10(4):226-234.
Sicherer, S.H. et al. (Feb. 2014, e-pub. Dec. 31, 2013). "Food Allergy: Epidemiology, Pathogenesis, Diagnosis, and Treatment," J. Allergy Clin. Immunol. 133:291-307.
Sicherer, S.H. et al. (Jul. 1998). "Clinical Features Of Acute Allergic Reactions To Peanut and Tree Nuts In Children," Pediatrics 102(1):1-6.
Sicherer, S.H. et al. (May 2010). "Immunologic features Of Infants With Milk Or Egg Allergy Enrolled In An Observational Study (Consortium of Food Allergy Research) Of Food Allergy)," J. Allergy Clin. Immunol. 125:1077-1083, 14 pages.
Singh, H. et al. (Oct. 2011). "Developing RP-HPLC Method For Detection Of Peanut Allergens," in AACC International Annual Meeting, Oct. 16-19, 2011. Retrieved from the Internet http://www.aaccnet.org/meetings/Documents/2011Abstracts/p11ma199.htm, last visited Feb. 17, 2016, 1 page. (Abstract Only).
Skolnick, H.S. et al. (Feb. 2001). "Food and Drug Reactions and Anaphylaxis: The Natural History Of Peanut Allergy," J. Allergy Clin. Immunol. 107(2):367-374.
Skripak, J.M. et al. (2009). "Mammalian Milk Allergy: Avoidance Strategies and Oral Desensitization," Curr. Opin. Allergy Clin. Immunol. 9:259-264.
Skripak, J.M. et al. (Dec. 2008). "A Randomized, Double-Blind, Placebo-Controlled Study Of Milk Oral Immunotherapy For Cow's Milk Allergy," J. Allergy Clin Immunol. 122(6): 1154-1160, 20 pages.
Tan, S.B. et al. (1990). "Powder Flowability As An Indication Of Capsule Filling Performance," International Journal of Pharmaceutics 61(1-2):145-156.
Thyagarajan, A. et al. (Feb. 2009). "Basophil Suppression in Peanut Allergic Subjects undergoing Peanut Oral Immunotherapy (OIT)," Journal of Allergy and Clinical Immunology 123:S214-S214, (Abstract Only).
Tilles, S. et al. (Mar. 2020). "Peanut Allergy Burden Survey: Correlates of Food Allergy Quality of Life Questionnaire—Teen Form Scores," J. Allergy Clin. Immunol. 145(2):Abstract # 469, AB147 Abstracts, 1 page.
Van Der Velde, J.L. et al. (May 2010). "Development, Validity and Reliability of the Food Allergy Independent Measure (FAIM)," Allergy 65(5)630-635.
Van Der Zee, T. et al. (Nov. 2011). "The Eliciting Dose Of Peanut In Double-Blind, Placebo-Controlled Food Challenges Decreases With Increasing Age and Specific IgE Level In Children and Young Adults," J. Allergy Clin. Immunol. 128(5):1031-1036.
Van Veen, W.J. et al. (2013). "Predictive Value Of Specific IgE For Clinical Peanut Allergy In Children: Relationship With Eczema, Asthma, and Setting (Primary Or Secondary Care)," Clinical and Translational Allergy 3:34, 7 pages.
Vander Leek, T.K. et al. (Dec. 2000). "The Natural History Of Peanut Allergy In Young Children and its Association With Serum Peanut-Specific IgE," J. Pediatr. 137(6):749-755.
Varshney, P. et al. (2009, e-pub. Nov. 13, 2009). "Adverse Reactions During Peanut Oral Immunotherapy Home Dosing," J. Allergy Clin. Immunol. 124(6):1351-1352, 5 pages.
Varshney, P. et al. (Mar. 2011). A Randomized Controlled Study Of Peanut Oral Immunotherapy: Clinical Desensitization and Modulation Of The Allergic Response, J. Allergy and Clinical Immunology 127(3):654-660.
Vereda, A. et al. (Sep. 30-Oct. 5, 2018). "Abstract 139: Efficacy and Safety of AR101: Results of the Phase 3 Peanut Allergy Oral Immunotherapy Study for Desensitization(PALISADE) Trial," Abstract: Allergy Across the Life Course—From Origins Towards Prevention, 32nd Symposium of the Collegium International Allergologium, 84 pages.
Merk, K., et al. (Jun. 2002). "Recalls Of Foods Containing Undeclared Allergens Reported To The US Food And Drug Administration, Fiscal Year 1999," J. Allergy Clin. Immunol. 109(6):1022-1026.
Virkud, Y.V. et al. (Mar. 2017). "Novel Baseline Predictors Of Adverse Events During Oral Immunotherapy In Children With Peanut Allergy," J. Allergy Clin. Immunol 139(3):882-888.
Wainstein, B.K. et al. (Jun. 2010). "Prediction of Anaphylazis During Peanut Food Challenge: Usefulness of the Peanut Skin Prick Test (SPT) and Specific IgE Level," Pediatr. Allergy Immunol. 21(4)(Pt. 1):603-611.
Wang, J. et al. (Feb. 2019). "Impact of Peanut Allergy on Quality of Life: Baseline Results from PALISADE, a Phase 3, Double-Blind, Placebo-Controlled Trial for AR101 Oral Immunotherapy," J. Allergy Clin. Immunol. 143(2):468, Abstracts AB155, 1 page.
Wang, J. et al. (Mar. 2011). "Food Allergy," J. Clinical Investigations 121(3):827-835.
Wensing, M. et al. (Dec. 2002). "The Distribution Of Individual Threshold Doses Eliciting Allergic Reactions In A Population With Peanut Allergy," J Allergy Clin Immunol. 100(6):915-920.
Wilson, D.R. et al. (2005). "Sublingual Immunotherapy For Allergic Rhinitis: Systematic Review and Meta-Analysis," Allergy 60(1):4-12.
Yamamoto, S. et al. (1992). "DNA From Bacteria, But Not From Vertebrates, Induces Interferons, Activates Natural Killer Cells and Inhibits Tumor Growth," Microbiol. Immunol. 36(9):983-997.
Zhuang, Y. et al. (Sep. 5, 2012). "Redefining the Major Peanut Allergens," Immunologic Research 55 (1-3):125-134.
Zimmermann, S. et al. (1998). "Cutting Edge: CpG Oligodeoxynucleotides Trigger Protective and Curative Th1 Responses in Lethal Murine Leishmaniasis," J. Immunol. 160:3627-3630.
Oxford English Dictionary. (n.d.). Indefinite. Retrieved Mar. 13, 2025, from https://www.oed.com/dictionary/indefinite_adj?tl=true.

* cited by examiner

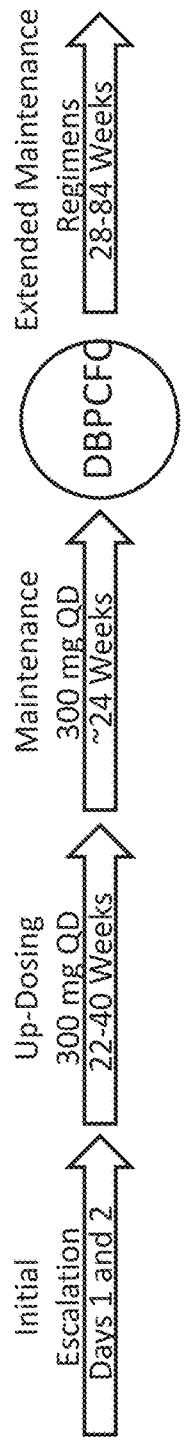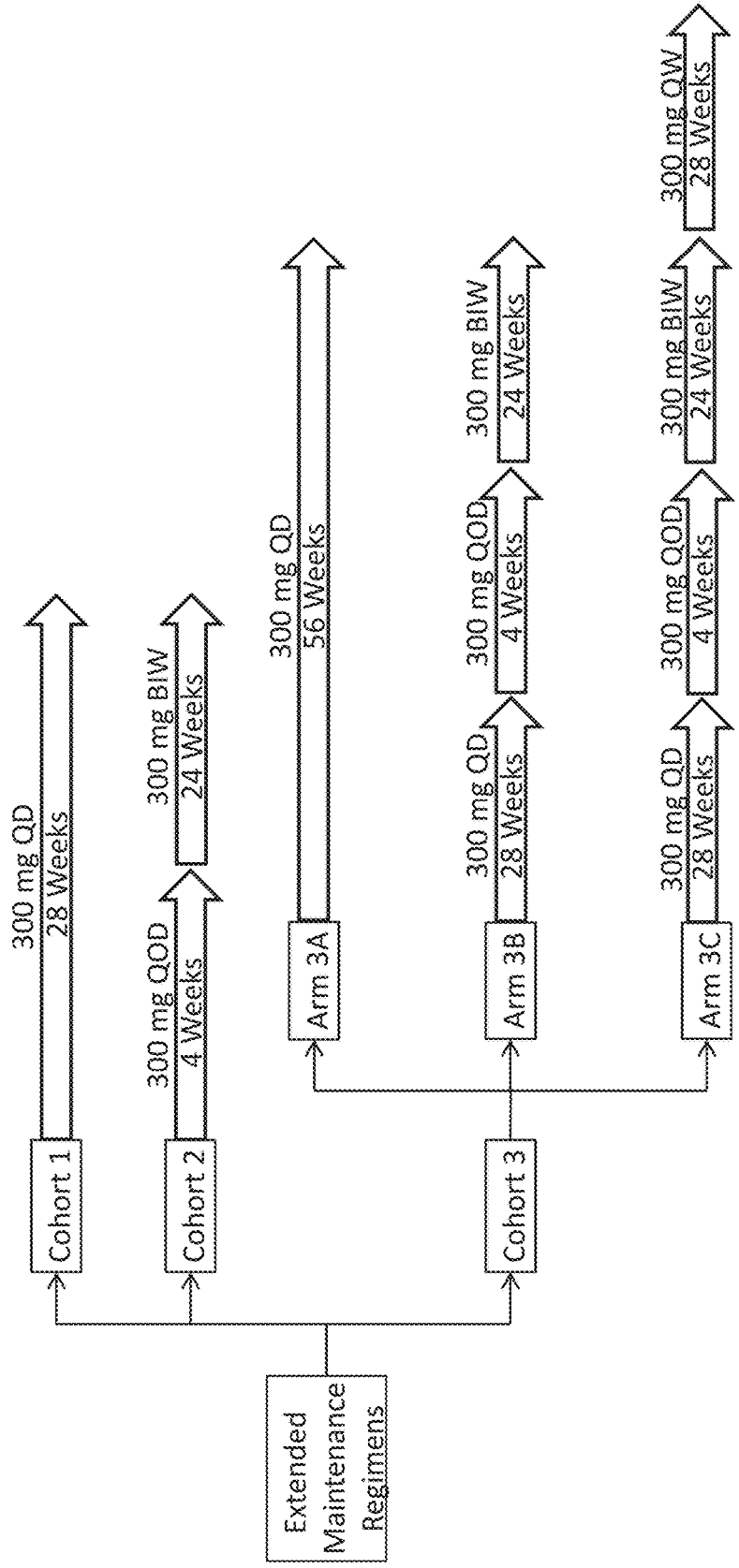

PEANUT ORAL IMMUNOTHERAPY WITH MAINTENANCE DOSE

CROSS-REFERENCE TO RELATED APPLICATIONS

This application claims priority benefit of U.S. Provisional Application No. 62/765,123, filed on Aug. 16, 2018; and U.S. Provisional Application No. 62/809,236, filed on Feb. 22, 2019; each of which is incorporated herein by reference in its entirety for all purposes.

FIELD OF THE INVENTION

Described herein are methods for treating peanut allergy using an oral immunotherapy comprising an up-dosing phase and a maintenance phase, wherein the maintenance phase may be longer than 24 weeks. Also described herein are methods for treating peanut allergy using an oral immunotherapy comprising an up-dosing phase and a maintenance phase that includes a non-daily maintenance dose.

BACKGROUND OF THE INVENTION

Peanut allergy is an allergic hypersensitivity reaction of the immune system to peanut protein. Peanut allergy often develops in childhood and is usually a lifelong affliction. Allergic reactions to peanut can be severe and life threatening, and are a major source of severe food-induced anaphylaxis.

Until recently, the standard of care for treating peanut allergy included dietary elimination and avoidance of peanuts, education on the signs of anaphylaxis, and administration of injectable epinephrine in response to severe (i.e., serious) allergic reactions with dietary exposure to peanut protein. However, accidental ingestion of peanuts is common, due to difficulty in interpreting food labels and the presence of undeclared ingredients in unlabeled food. Oral immunotherapy (OIT) is a promising new treatment for peanut allergy. See, for example, Bird et al., *Efficacy and Safety of AR101 in Oral Immunotherapy for Peanut Allergy: Results of ARC001; a randomized Double-Blind, Placebo-Controlled Phase 2 Clinical Trial*, J. Allergy Clin. Immunol. Pract., vol. 6, no. 2, p. 476-485 (2018). Peanut OIT includes exposing patients to gradually increasing doses of peanut protein to induce desensitization, which is intended to reduce the risk of a serious reaction upon accidental exposure to peanut.

Although peanut OIT has been shown to be effective at inducing a desensitized state in many subjects, this state may not persist after therapy is discontinued; thus it is desirable for subjects to remain on the therapy to ensure long-term, maintained desensitization. Oral immunotherapy methods that further improve compliance and safety are desired.

SUMMARY OF THE INVENTION

Described herein is a method of treating a subject for a peanut allergy by an oral immunotherapy comprising an up-dosing phase and a maintenance phase, the method comprising administering to the subject on a non-daily basis a maintenance phase dose during at least a portion of the maintenance phase.

In some embodiments, the maintenance phase dose is administered to the subject at a frequency between less than once per day and once every four weeks for at least a portion of the maintenance phase. In some embodiments, the maintenance phase dose is administered to the subject every other day, every third day, every fourth day, every fifth day, every sixth day, once per week, twice a week, three times a week, four times a week, five times a week, six times a week, once every two weeks, once every three weeks, or once every four weeks for at least a portion of the maintenance phase.

In some embodiments, the maintenance phase dose is administered to the subject every other day for at least a portion of the maintenance phase. In some embodiments, the maintenance phase dose is administered to the subject every other day for about 4 weeks or more during the maintenance phase.

In some embodiments, the maintenance phase dose is administered to the subject twice a week during at least a portion of the maintenance phase. In some embodiments, the maintenance phase dose is administered to the subject twice a week for about 20 weeks or more during the maintenance phase.

In some embodiments, the maintenance phase dose is administered to the subject every other day prior to the maintenance phase dose being administered to the subject twice a week.

In some embodiments, the maintenance phase dose is administered to the subject for more than 24 weeks. In some embodiments, the maintenance phase dose is administered to the subject for about 52 weeks or more. In some embodiments, the maintenance phase dose is administered to the subject for about 52 weeks to about 108 weeks.

In some embodiments, the subject does not tolerate a dose of about 1000 mg peanut protein after 24 weeks of the maintenance phase. In some embodiments, the subject tolerates a dose of about 2000 mg peanut protein at the completion of the maintenance phase. In some embodiments, the subject tolerates a cumulative dose of about 4043 mg at the completion of the maintenance phase.

In some embodiments, the maintenance phase dose is administered to the subject once a week during at least a portion of the maintenance phase. In some embodiments, the maintenance phase dose is administered to the subject once a week for about 28 weeks or more during the maintenance phase.

In some embodiments, the maintenance phase dose is administered to the subject once per week during at least a portion of the maintenance phase following more frequent administration of the maintenance phase dose.

In some embodiments, the maintenance phase dose is administered to the subject daily during at least a portion of the maintenance phase. In some embodiments, the maintenance phase dose is administered to the subject on a daily basis for about 6 months or more, such as about 6 months to about 2 years, during the maintenance phase. In some embodiments, the maintenance phase dose is administered to the subject daily during the maintenance phase prior to the maintenance phase dose being administered to the subject non-daily during the maintenance phase.

In some embodiments, the maintenance phase dose is administered to the subject at a first frequency during a first portion of the maintenance phase, and at a second frequency during a second portion of maintenance phase, wherein the first frequency or the second frequency is a non-daily frequency. In some embodiments, the first frequency or the second frequency is a frequency between less than once per day and once every four weeks. In some embodiments, the first frequency or the second frequency is every other day, every third day, every fourth day, every fifth day, every sixth day, once per week, twice a week, three times a week, four times a week, five times a week, six times a week, once every two weeks, once every three weeks, or once every four weeks.

In some embodiments, the maintenance phase dose comprises about 300 mg or more of peanut protein. In some embodiments, the maintenance phase dose comprises about 300 mg of peanut protein.

In some embodiments, the subject is about 12 months old or older. In some embodiments, the subject is about 4 years old or older. In some embodiments, the subject is between about 4 years old and about 17 years old.

In some embodiments, the up-dosing phase comprises administering to the subject two or more different doses between about 3 mg and about the dose of the initial maintenance phase dose. In some embodiments, the up-dosing phase is between about 3 months and about 2 years in length.

In some embodiments, the oral immunotherapy further comprises an initial escalation phase.

In some embodiments, the methods further comprise monitoring the subject for an allergic adverse event. In some embodiments, the allergic adverse event is an allergic reaction to peanut protein.

Further described herein is a method of treating a subject for a peanut allergy by an oral immunotherapy, comprising administering to the subject peanut protein according to an oral immunotherapy schedule comprising an up-dosing phase and a maintenance phase, the maintenance phase comprising administering to the subject a maintenance phase dose for more than 24 weeks. In some embodiments, the maintenance phase dose is administered on a daily basis for at least a portion of the maintenance phase. In some embodiments, the maintenance phase dose is administered to the subject for about 28 weeks or more. In some embodiments, the maintenance phase dose is administered to the subject for about 52 weeks or more. In some embodiments, the maintenance phase dose is administered to the subject for about 52 weeks to about 108 weeks. In some embodiments, the subject does not tolerate a dose of about 1000 mg peanut protein after 24 weeks of the maintenance phase. In some embodiments, the subject tolerates a dose of about 2000 mg peanut protein at the completion of the maintenance phase. In some embodiments, the subject tolerates a cumulative dose of about 4043 mg at the completion of the maintenance phase. In some embodiments, the maintenance phase dose is administered to the subject on a non-daily basis during at least a portion of the maintenance phase. In some embodiments, the maintenance phase dose is administered to the subject at a frequency between less than once per day and once every four weeks for at least a portion of the maintenance phase. In some embodiments, the maintenance phase dose is administered to the subject every other day, every third day, every fourth day, every fifth day, every sixth day, once per week, twice a week, three times a week, four times a week, five times a week, six times a week, once every two weeks, once every three weeks, or once every four weeks for at least a portion of the maintenance phase. In some embodiments, the maintenance phase dose is administered to the subject every other day for at least a portion of the maintenance phase. In some embodiments, the maintenance phase dose is administered to the subject every other day for about 4 weeks or more during at least a portion of the maintenance phase. In some embodiments, the maintenance phase dose is administered to the subject twice a week during at least a portion of the maintenance phase. In some embodiments, the maintenance phase dose is administered to the subject twice a week for about 20 weeks or more during at least a portion of the maintenance phase. In some embodiments, the maintenance phase dose comprises about 300 mg or more of peanut protein. In some embodiments, the maintenance phase dose comprises about 300 mg of peanut protein. In some embodiments, the subject is about 12 months old or older. In some embodiments, the subject is about 4 years old or older. In some embodiments, the subject is between about 4 years old and about 17 years old. In some embodiments, the up-dosing phase comprises administering to the subject two or more different doses between about 3 mg and about the dose of the initial maintenance phase dose. In some embodiments, the up-dosing phase is between about 3 months and about 2 years in length. In some embodiments, the oral immunotherapy further comprises an initial escalation phase. In some embodiments, the method further comprises monitoring the subject for an allergic adverse event. In some embodiments, the allergic adverse event is an allergic reaction to peanut protein.

Further described herein is a method of treating a subject for a peanut allergy by an oral immunotherapy comprising an up-dosing phase and a maintenance phase, comprising administering to the subject on a non-daily basis a maintenance phase dose, observing at least one allergic adverse event in the subject receiving a non-daily maintenance phase dose of peanut protein as part of an oral immunotherapy, and increasing the frequency of administration of the maintenance phase dose during the maintenance phase of the oral immunotherapy in response to the observed at least one allergic adverse event. In some embodiments, the frequency of administration of the maintenance phase dose is increased from a non-daily administration to a daily administration. In some embodiments, the frequency of administration of the maintenance phase dose is increased to an every other day administration of the maintenance phase dose. In some embodiments, the frequency of administration of the maintenance phase dose is increased to a twice weekly administration of the maintenance phase dose. In some embodiments, the frequency of administration of the maintenance phase dose is increased to a once weekly administration of the maintenance phase dose. In some embodiments, the frequency of administration of the maintenance phase dose is increased in response to observing the at least one allergic adverse event. In some embodiments, the maintenance phase dose comprises about 300 mg or more of peanut protein. In some embodiments, the maintenance phase dose comprises about 300 mg of peanut protein. In some embodiments, the subject is about 12 months old or older, such as about 4 years old or older. In some embodiments, the subject is between about 4 years old and about 17 years old. In some embodiments, the method further comprises monitoring the subject for an allergic adverse event.

Also described herein is a method of increasing tolerance of peanut protein in a subject with a peanut allergy, the method comprising administering to the subject peanut protein according to an oral immunotherapy schedule comprising an up-dosing phase and a maintenance phase, the maintenance phase comprising administering to the subject a maintenance phase dose for more than 24 weeks. In some embodiments, the maintenance phase dose is administered on a daily basis. In some embodiments, the maintenance phase dose is administered to the subject for about 28 weeks or more. In some embodiments, the maintenance phase dose is administered to the subject for about 52 weeks or more. In some embodiments, the maintenance phase dose is administered to the subject for about 52 weeks to about 108 weeks. In some embodiments, the subject does not tolerate a dose of about 1000 mg peanut protein after 24 weeks of the maintenance phase. In some embodiments, the subject tolerates a dose of about 2000 mg peanut protein at the completion of the maintenance phase. In some embodiments, the subject tolerates a cumulative dose of about 4043 mg at the completion of the maintenance phase. In some embodiments, the maintenance phase dose comprises about 300 mg or more of peanut protein. In some embodiments, the maintenance phase dose comprises about 300 mg of peanut protein. In some embodiments, the subject is about 12 months old or older. In some embodiments, the subject is about 4 years old or older. In some embodiments, the subject is between about 4 years old and about 17 years old. In some embodiments, the up-dosing phase comprises administering to the subject two or more different doses between about 3 mg and about the dose of the initial maintenance phase dose. In some embodiments, the up-dosing phase is between about 3 months and about 2 years in length. In some embodiments, the oral immunotherapy further comprises an initial escalation phase.

Also described herein is a method of treating a subject for a peanut allergy by an oral immunotherapy comprising an up-dosing phase and a maintenance phase, the method comprising: (a) administering to the subject a maintenance phase dose for more than 24 weeks; (b) testing the subject for a highest tolerated peanut protein dose by an oral food challenge; (c) selecting a subject for additional maintenance phase dosing based on the subject tolerating a maximum dose of less than 1,000 mg peanut protein; and (d) continuing to administer to the selected subject the maintenance phase dose. In some embodiments, the maintenance phase dose is administered to the selected subject for at least 4 additional weeks. In some embodiments, the selecting a subject for additional maintenance phase dosing is further based on the subject tolerating a cumulative dose of less than 4,043 mg of peanut protein. In some embodiments, the maintenance phase dose comprises about 300 mg or more of peanut protein. In some embodiments, the subject is about 12 months old or older. In some embodiments, the subject is about 4 years old or older. In some embodiments, the subject is between about 4 years old and about 17 years old. In some embodiments, the maintenance phase dose is administered to the selected subject for at least 28 additional weeks. In some embodiments, the maintenance phase dose is administered to the selected subject for about 28 additional weeks to about 84 additional weeks. In some embodiments, the selected subject tolerates a dose of about 2,000 mg peanut protein at completion of the additional weeks of maintenance phase dosing. In some embodiments, the selected subject tolerates a cumulative dose of about 4,043 mg peanut protein at the completion of the additional weeks of maintenance phase dosing. In some embodiments, the up-dosing phase comprises administering to the subject two or more different doses between about 3 mg and about the dose of the initial maintenance phase dose. In some embodiments, the up-dosing phase is between about 3 months and about 2 years in length. In some embodiments, the oral immunotherapy further comprises an initial escalation phase.

BRIEF DESCRIPTION OF THE DRAWINGS

FIG. 1A illustrates an exemplary treatment protocol for treating a subject for a peanut allergy by oral immunotherapy that includes daily administration of a maintenance dose. The subject proceeds through initial escalation, up-dosing, and a first portion of a maintenance phase with daily administrations (QD) of 300 mg peanut protein per dose. The subject may be tested for desensitization by a double-blind placebo-controlled food challenge (DBPCFC), such as described in Example 1. However, the DBPCFC is not mandatory. Optionally, the subject then enters another portion or portions of the maintenance phase (the extended maintenance regimens) as illustrated in FIG. 1B. The length of the dosing schedules illustrated in the FIGURE are exemplary, and can be increased or decreased as discussed herein.

FIG. 1B illustrates exemplary maintenance phases of an oral immunotherapy, which may follow the maintenance phase illustrated in FIG. 1A, or may follow an up-doing phase. In Cohort 1, subjects are treated using a maintenance phase that includes 28-weeks of daily (QD) administration of a 300 mg peanut protein dose. In Cohort 2, subjects are treated using a maintenance phase that includes a first portion of 4-weeks of every other day (QOD) administration of 300 mg peanut protein (maintenance dose), followed by a second portion that includes 24-weeks of twice a week (BIW) administration of a 300 mg peanut protein (maintenance dose). In Cohort 3, the subjects are divided into three arms. In arm 3A, subjects are administered a maintenance phase that includes 56-weeks of daily administration of a 300 mg peanut protein dose (maintenance dose). In arm 3B, subjects are administered a maintenance phase that includes a first portion of 28-weeks of daily (QD) administration of 300 mg peanut protein (maintenance dose), followed by a second portion of 4-weeks of every other day administration of 300 mg peanut protein (maintenance dose), followed by a third portion of 24-weeks of twice a week administration of 300 mg peanut protein (maintenance dose). In arm 3C, subjects are administered a maintenance phase that includes a first portion of 28-weeks of daily (QD) administration of 300 mg peanut protein (maintenance dose), followed by a second portion of 4-weeks of every other day (QOD) administration of 300 mg peanut protein (maintenance dose), followed by a third portion of 24-weeks of twice weekly administration of 300 mg peanut protein (maintenance dose), followed by a fourth portion of 28-weeks of once weekly (QW) administration of 300 mg peanut protein (maintenance dose). The length of the dosing schedules (e.g., portions) illustrated in the FIGURE are exemplary, and can be increased or decreased as discussed herein.

DETAILED DESCRIPTION OF THE INVENTION

Described herein are methods of treating a subject for a peanut allergy by an oral immunotherapy comprising an up-dosing phase and a maintenance phase, and methods of reducing the risk of an allergic adverse event in a subject receiving an oral immunotherapy.

In some embodiments, the oral immunotherapy includes non-daily administration (i.e., administering to the subject on a non-daily basis) of a maintenance phase dose during at least a portion of (or the entirety of) the maintenance phase. Non-daily administration of the maintenance phase dose refers to administration of the maintenance phase dose with a frequency less than daily.

In some embodiments, the oral immunotherapy includes administration of a maintenance phase dose for more than about 24 weeks.

In some embodiments, the oral immunotherapy includes non-daily administration (i.e., administering to the subject on a non-daily basis) of a maintenance phase dose during at least a portion of (or the entirety of) the maintenance phase, wherein the maintenance phase is administered for more than about 24 weeks.

Oral immunotherapy is a method of inducing desensitization to an allergen in a subject by regular exposure of the subject to increasing doses of the allergen. For peanut allergy, protocols for OIT typically involve an up-dosing phase (also called a build-up phase) and a maintenance phase. Preferably, the OIT further includes an initial escalation phase, although this phase is optional and not required for treatment. The initial escalation phase involves exposure to small doses of peanut protein under clinical supervision to determine the sensitivity of the patient to the peanut protein. This initial escalation phase generally occurs over the course of several (e.g. three or more) hours to two days. These small doses are increased until the subject reaches a goal dose or a highest tolerated dose for the initial escalation phase. The subject then usually begins an up-dosing phase, with regular consultation with a caregiver, usually beginning with the highest tolerated dose administered in the initial escalation phase or a slightly lower dose, and escalating through a series of doses in an up-dosing phase. Additionally, peanut OIT includes a maintenance phase involving the long-term administration of peanut protein. The primary goal of oral immunotherapy is establishing a desensitized state, wherein the subject being treated is less likely to suffer a severe (i.e., serious) or life-threatening allergic reaction upon accidental exposure to peanut protein.

After initial treatment during the up-dosing phase, the patient is further treated during a maintenance phase. As further described herein, it has been discovered that a non-daily maintenance phase dose, wherein the maintenance phase dose is administered at a frequency of less than daily for at least a portion of the maintenance phase during the course of peanut oral immunotherapy, is effective at sustaining a desensitized state.

The maintenance phase dose can also be administered on a daily basis, and may extend for more than about 24 weeks. Extension of the maintenance phase past 24 weeks during OIT was found to increase the portion of peanut-allergic patients that tolerated threshold amounts of peanut protein. For example, a clinical study of extended maintenance phase during OIT for the treatment of peanut allergy found that, of peanut-allergic patients that tolerated less than 1000 mg of peanut protein following 24 weeks of a maintenance phase, 69.2% of patients tolerated a higher dose of peanut protein with an additional 24 weeks of maintenance phase treatment at the same dose level. These clinical findings of higher peanut tolerability were matched by favorable immunological changes, suggestive of ongoing immunomodulation during the additional daily dosing maintenance period. Thus, the maintenance phase can be extended to more than 24 weeks to increase tolerance of peanut protein.

The peanut oral immunotherapies described herein improve the compliance and/or safety of the OIT.

Definitions

As used herein, the singular forms "a," "an," and "the" include the plural references unless the context clearly dictates otherwise.

Reference to "about" a value or parameter herein includes (and describes) variations that are directed to that value or parameter per se. For example, description referring to "about X" includes description of "X".

As used herein, "daily" dosing means administering a dose on each consecutive calendar day. The dose may be administered as a single portion on the calendar day, or subdivided into multiple portions administered within the same calendar day.

The term "desensitized" is used herein to refer to an increased reaction threshold to a food allergen by a subject as a result of an oral immunotherapy for the food allergen. Desensitization to a food allergen can be tested using methods known in the art, including an oral food challenge. Desensitization may be partial, wherein the subject tolerates an increased amount of the food allergen compared to prior to treatment, but still reacts to higher doses of the food allergen; or the desensitization may be complete, wherein the patient tolerates all tested doses of the food allergen.

The terms "effective," "efficacy," or "effectiveness" are used herein to refer to the ability of a therapy to induce immune modulation, such as desensitization, or sustain a desired immune state, such as a desensitized state, unless otherwise indicated.

As used herein, "maintenance phase" refers to a phase of a peanut protein oral immunotherapy that includes administration of peanut protein (i.e., a maintenance dose) to the patient, and occurs after completion of the up-dosing phase.

As used herein, a "mild allergic adverse event" refers to an observed or experienced OIT-treatment-related allergic adverse event associated with transient discomfort, but does not require immediate medical intervention such as hospitalization or epinephrine, and does not substantially interfere with daily activities.

As used herein, a "moderate allergic adverse event" refers to an observed or experienced OIT-treatment-related allergic adverse event that is associated with discomfort of a sufficient degree to interfere with daily activities and that may prompt medical intervention and/or additional observation.

As used herein, "non-daily" dosing means dosing with a frequency of less than once per day.

As used herein, the phrase "serious allergic adverse event" refers to an observed or experienced OIT-treatment-related allergic adverse event leading to anaphylaxis that requires hospitalization and/or administration of epinephrine or other life-saving medical intervention.

The term "subject" or "patient" is used synonymously herein to describe a human of any age.

A subject "tolerates" a dose when the dose is administered to the subject without any moderate or severe (i.e., serious) allergic adverse event. A subject is considered to tolerate the dose even if a mild allergic adverse event is observed or experienced.

The terms "treat," "treating," and "treatment" are used synonymously herein to refer to any action providing a benefit to a subject afflicted with a disease state or condition, including improvement in the condition through lessening, inhibition, suppression, or elimination of at least one symptom; delay in progression of the disease; delay in recurrence of the disease; inhibition of the disease; or partially or fully reducing a response or reaction to an allergen.

An "up-dosing phase" refers to a phase of an oral immunotherapy characterized by a series of increasing food allergen doses, beginning with administration of a dose of food allergen lower than the highest dose administered to the patient during the oral immunotherapy, and ending when the highest dose administered to the patient during the oral immunotherapy is achieved.

It is understood that aspects and variations of the invention described herein include "consisting" and/or "consisting essentially of" aspects and variations.

When a range of values is provided, it is to be understood that each intervening value between the upper and lower limit of that range, and any other stated or intervening value in that states range, is encompassed within the scope of the present disclosure. Where the stated range includes upper or lower limits, ranges excluding either of those included limits are also included in the present disclosure.

The section headings used herein are for organization purposes only and are not to be construed as limiting the subject matter described. The description is presented to enable one of ordinary skill in the art to make and use the invention and is provided in the context of a patent application and its requirements. Various modifications to the described embodiments will be readily apparent to those persons skilled in the art and the generic principles herein may be applied to other embodiments. Thus, the present invention is not intended to be limited to the embodiment shown but is to be accorded the widest scope consistent with the principles and features described herein.

The disclosures of all publications, patents, and patent applications referred to herein are each hereby incorporated by reference in their entireties. To the extent that any reference incorporated by reference conflicts with the instant disclosure, the instant disclosure shall control.

Peanut Oral Immunotherapy

A subject having a peanut allergy can be treated for the peanut allergy by administering a series of doses of a peanut protein composition, according to a dosing schedule, to the subject during the course of an oral immunotherapy, thereby desensitizing the subject to the peanut allergy.

In some embodiments of the oral immunotherapy described herein, the maintenance phase may comprise non-daily administration to the subject of a maintenance phase dose during at least a portion of the maintenance phase, or the entire maintenance phase. In certain embodiments, the maintenance phase includes daily administration of the maintenance phase dose during a first portion of the maintenance phase and non-daily administration of the maintenance phase dose during a second portion of the maintenance phase. In other embodiments, the maintenance phase does not include daily administration of the maintenance dose.

In some embodiments of the oral immunotherapy described herein, the maintenance phase may include administration to the patient of a maintenance phase dose for more than about 24 weeks.

The full-length of the oral immunotherapy, for example the duration of the up-dosing phase and/or maintenance phase, may vary between subjects depending on the age, health conditions, the nature and type of peanut allergy, concurrent interventions, and/or complicating indications, among others. The therapy is generally multi-phasic, and includes at least an up-dosing phase and a maintenance phase. In some embodiments, the oral immunotherapies may further include an initial escalation phase preceding the up-dosing phase. The doses of the peanut protein composition administered in the up-dosing and maintenance phases can be periodically adjusted or scheduled to increase, decrease, or stay the same. The size of the doses of the peanut protein composition administered in the up-dosing and maintenance phases can be adjusted as necessary based on the judgment of a subject's medical caregiver and/or the needs of the subject.

Methods of diagnosing peanut allergy are known in the art and include immunological assays (such as peanut-specific IgE), skin prick tests, food challenges, and trial elimination diets. For diagnosis of peanut allergy by food challenge, the subject receives increasing doses of peanut protein. An observed allergic reaction to the peanut protein during the food challenge indicates the subject has a peanut allergy and is a candidate for peanut oral immunotherapy. The judgment of whether a subject reacts to a particular dose during the food challenge depends on the test criteria, which can vary. A reaction in a food challenge can be judged by the severity of symptoms (e.g., mild, moderate, or severe (i.e., serious)) and/or the observability of the symptom (e.g., whether a symptom is subjectively reported by the patient or objectively observed by the medical caregiver).

A subject undergoing peanut OIT as described herein for treatment of a peanut allergy has a known or suspected peanut allergy. In some embodiments, the subject has previously attempted or completed a peanut protein OIT. In some embodiments, the previous peanut protein OIT was ineffective (for example, by failing to induce acceptable desensitization, producing unacceptable allergic adverse reactions, or failing to impart adequate protection from accidental exposure to peanut protein), was terminated by the patient due to discomfort, inconvenience (for example, due to the daily dosing or frequent clinical visits), or necessity (for example, due to reaction to the peanut protein doses and/or due to allergic adverse events during the course of OIT), or was terminated by the patient's medical caregiver (for example, due to allergic adverse reaction to peanut protein doses and/or due to allergic adverse events during the course of OIT).

A subject undergoing peanut OIT as described herein for treatment of a peanut allergy may be treatment naïve, having never undergone a peanut OIT for the treatment of a peanut allergy. A subject being diagnosed for peanut allergy by diagnostic exposure to peanut protein, such as in a food challenge, but with no other history of clinical exposure to peanut protein, is still considered treatment naïve after the diagnostic exposure for the purposes of this application.

The subject receiving the oral immunotherapy treatment for peanut allergy is a human subject. In some embodiments, the subject is about 12 months or older, such as about 12 months to about 48 months (for example, about 12 months to about 24 months, about 24 months to about 36 months, or about 36 months to about 48 months). In some embodiments, the subject is about 4 years or older. In some embodiments, the subject is between 4 years and less than 18 years old. In some embodiments, the subject is 18 years or older.

The up-dosing phase precedes the maintenance phase, and includes administration of a series of escalating doses to reach the maximum dose administered to the subject during the course of oral immunotherapy. The length of time of the up-dosing phase can be adapted according the needs of an individual patient, although is generally completed in about 22 to about 40 weeks. For some patients, the up-dosing phase may last as long as 2 years or more. The up-dosing phase may be extended, for example, if a patient experiences allergic adverse events after beginning a higher dose in the dosing series.

The up-dosing phase of a peanut OIT typically involves incrementally increasing the administered peanut protein dose after a period of time (e.g., approximately every 1-4 weeks). A particular dose in the series is repeatedly (e.g., daily) administered to the patient until advancing to the next dose in the series. In some instances, such as when the subject does not tolerate a particular dose in the series or the subject experiences one or more allergic adverse events, the dose is decreased or the dose in the series is repeated for a period of time prior to advancing to the next dose in the series. The rate of up-dosing (e.g., the length of time an individual dose in the series is administered or the size of the dose increment between doses in the series) may be adjusted based on one or more observed allergic adverse events.

The maintenance phase of the peanut oral immunotherapy begins after the highest dose of the up-dosing phase is achieved. In some embodiments, the maintenance phase comprises administering to the subject on a non-daily basis a maintenance phase dose during at least a portion of the maintenance phase, or for the entire maintenance phase. However, the maintenance phase may include both non-daily and daily dosing frequencies, such as a first portion of the maintenance phase comprising a daily dosing frequency and a second portion of the maintenance phase comprising a non-daily dosing frequency. In some embodiments, the maintenance phase comprises administering to the subject a maintenance phase dose for more than about 24 weeks. In some embodiments, the maintenance phase comprises administering to the subject on a non-daily basis a maintenance phase dose during at least a portion of the maintenance phase, or for the entire maintenance phase, wherein the maintenance phase is longer than about 24 weeks. Additional exemplary maintenance dosing schedules are described in further detail herein.

Optionally, the oral immunotherapy includes an initial escalation phase before the up-dosing phase, wherein the subject is administered over the course of one or two days a series of escalating doses. The initial escalation phase is distinguished from the up-dosing phase by a lower dose range, shorter intervals between dose escalations, and, typically, closer monitoring by the subject's medical caregiver. For example, a two day initial escalation may comprise a series of doses from about 0.5 mg to about 6 mg peanut protein, such as individual doses of about 0.5 mg, about 1 mg, about 1.5 mg, about 3 mg, and about 6 mg peanut protein. The highest tolerated dose of the initial escalation phase, or a dose lower than the highest tolerated dose in the initial escalation phase, may be the first dose of the up-dosing phase. If a subject does not tolerate at least a certain dose in the initial escalation phase, the subject may be excluded from the oral immunotherapy. For example, if a subject suffers a serious allergic adverse event after administration of the 0.5 mg, 1 mg, or 1.5 mg peanut protein dose, the subject may not be allowed to proceed to the up-dosing phase. The purposes of the initial escalation phase include calibrating the doses of the up-dosing phase (e.g., the initial dose of the up-dosing phase), and ensuring the suitability of the subject for safely proceeding through an up-dosing phase.

Maintenance Phase Dosing Schedules

The maintenance phase of the peanut oral immunotherapy begins after the highest dose of the up-dosing phase is achieved. The maintenance phase comprises administration of peanut protein (i.e., a maintenance dose) to the patient on a daily or non-daily basis (or daily for a portion of the maintenance phase and non-daily for a portion of the maintenance phase). The frequency of administration of the maintenance phase dose may be adjusted, as discussed herein. The length of the maintenance phase may vary, as also discussed herein. The dose of peanut protein administered during the maintenance phase is usually the highest tolerated dose obtained by the patient during the up-dosing phase, although the dose may be reduced under certain circumstances.

In some embodiments, the total duration of the treatment, including the up-dosing phase and maintenance phase, is between about 1 year and about 5 years in duration, such as about 1 year to about 2 years, about 1 year to about 3 years, or about 1 year to about 4 years in duration.

In some embodiments, the maintenance phase is more than about 24 weeks or longer, and may be for the entire life of the patient. For example, the length of the maintenance phase may be more than about 28 weeks, more than about 32 weeks, more than about 36 weeks, more than about 40 weeks, more than about 44 weeks, or more than about 48 weeks. In some embodiments, the maintenance phase is more than about 24 weeks to about 28 weeks, about 28 weeks to about 32 weeks, about 32 weeks to about 36 weeks, about 36 weeks to about 40 weeks, about 40 weeks to about 44 weeks, about 44 weeks to about 48 weeks, about 48 weeks to about 52 weeks, about 52 weeks to about 60 weeks, about 60 weeks to about 72 weeks, about 72 weeks to about 80 weeks, or more than about 80 weeks, such as the life of the subject. In some embodiments, the maintenance phase is up to about 108 weeks in length.

In some embodiments, the maintenance phase dose is administered to the subject daily during at least a portion of the maintenance phase. In some embodiments, the maintenance phase dose is administered to the subject daily for about 6 months to about 2 years during the maintenance phase, such as about 6 months, about 6 months to about 12 months, about 12 months to about 18 months, or about 18 months to about 2 years.

The dosage of peanut protein administered to the subject during the maintenance phase is between about 200 mg and about 1,000 mg peanut protein. For example, in some embodiments, a dose during the maintenance phase is between about 200 mg and about 300 mg peanut protein, about 300 mg and about 500 mg peanut protein, about 500 mg and about 1,000 mg peanut protein, or values and ranges therebetween. In an exemplary embodiment, a maintenance phase dose administered to the subject during the maintenance phase is about 300 mg peanut protein. In some embodiments, the maintenance phase dose is administered to the subject for more than 24 weeks and the maintenance phase dose is administered on a daily basis. In some embodiments, the maintenance phase dose is administered to the subject for more than 24 weeks and the maintenance phase dose is administered on a non-daily basis for at least a portion of the maintenance phase.

In some embodiments, the maintenance phase dose is administered to the subject for about 52 weeks or more and the maintenance phase dose is administered on a daily basis. In some embodiments, the maintenance phase dose is administered to the subject for 52 weeks or more and the maintenance phase dose is administered on a non-daily basis for at least a portion of the maintenance phase.

In some embodiments, the maintenance phase dose is administered to the subject for more than 24 weeks, the subject is between 4 years old and less than 18 years old, the maintenance phase dose comprises about 300 mg or more of peanut protein, and the maintenance phase dose is administered on a daily basis. In some embodiments, the maintenance phase dose is administered to the subject for more than 24 weeks, the subject is between 4 years old and less than 18 years old, the maintenance phase dose comprises about 300 mg or more of peanut protein, and the maintenance phase dose is administered on a non-daily basis for at least a portion of the maintenance phase.

In some embodiments, the maintenance phase dose is administered to the subject for about 52 weeks or more, the subject is between 4 years old and less than 18 years old, the maintenance phase dose comprises about 300 mg or more of peanut protein, and the maintenance phase dose is administered on a daily basis. In some embodiments, the maintenance phase dose is administered to the subject for about 52 weeks or more, the subject is between 4 years old and less than 18 years old, the maintenance phase dose comprises about 300 mg or more of peanut protein, and the maintenance phase dose is administered on a non-daily basis for at least a portion of the maintenance phase.

In some embodiments, the maintenance phase dose is administered to the subject for more than 24 weeks, the immunotherapy further comprises an initial escalation phase, the up-dosing phase is between about 3 months and about 2 years in length, the maintenance phase dose comprises about 300 mg or more of peanut protein, and the maintenance phase dose is administered on a daily basis. In some embodiments, the maintenance phase dose is administered to the subject for more than 24 weeks, the immunotherapy further comprises an initial escalation phase, the up-dosing phase is between about 3 months and about 2 years in length, the maintenance phase dose comprises about 300 mg or more of peanut protein, and the maintenance phase dose is administered on a non-daily basis for at least a portion of the maintenance phase.

In some embodiments, the maintenance phase dose is administered to the subject for about 52 weeks or more, the immunotherapy further comprises an initial escalation phase, the up-dosing phase is between about 3 months and about 2 years in length, the maintenance phase dose comprises about 300 mg or more of peanut protein, and the maintenance phase dose is administered on a daily basis. In some embodiments, the maintenance phase dose is administered to the subject for about 52 weeks or more, the immunotherapy further comprises an initial escalation phase, the up-dosing phase is between about 3 months and about 2 years in length, the maintenance phase dose comprises about 300 mg or more of peanut protein, and the maintenance phase dose is administered on a non-daily basis for at least a portion of the maintenance phase.

In some embodiments, described herein are methods of treating a subject for a peanut allergy by an oral immunotherapy comprising an up-dosing phase and a maintenance phase, the method comprising administering to the subject on a non-daily basis a maintenance phase dose during at least a portion of the maintenance phase, or for the entire maintenance phase. Known peanut oral immunotherapy maintenance phases include daily administration of peanut protein. In any of the described methods, non-daily dosing means less-than-daily dosing. Exemplary non-daily dosing includes administration of the peanut protein every other day, every third day, every fourth day, every fifth day, every sixth day, twice a week, three times a week, four times a week, five times a week, six times a week, weekly (i.e., once per week), or less than weekly (such as less than once every week to once every four weeks, once every two weeks, once every three weeks, or once every four weeks).

In any of the described methods, the maintenance phase may be divided into a plurality of portions, with each portion distinguished by a particular dosing frequency, wherein at least one portion has a non-daily dosing frequency. For example, the maintenance phase may be administered to the patient on a daily basis or other frequency (i.e., a first portion), which is followed by administration of the maintenance dose to the patient on a non-daily dose (i.e., the second portion). In other embodiments, the maintenance phase is a single non-daily dosing frequency, and the maintenance phase is not divided into portions.

In some embodiments, the maintenance phase comprises a first portion comprising a first dosing frequency, and a second portion comprising a second dosing frequency, wherein the dosing frequencies of each portion are different. In some embodiments, the maintenance phase comprises a first portion comprising a first dosing frequency, a second portion comprising a second dosing frequency, and a third portion comprising a third dosing frequency, wherein the dosing frequencies of each portion are different. In some embodiments, the maintenance phase comprises a first portion comprising a first dosing frequency, a second portion comprising a second dosing frequency, a third portion comprising a third dosing frequency, and a fourth portion comprising a fourth dosing frequency, wherein the dosing frequencies of each portion are different. In some embodiments, the maintenance phase comprises a first portion comprising a first dosing frequency, a second portion comprising a second dosing frequency, a third portion comprising a third dosing frequency, a fourth portion comprising a fourth dosing frequency, and a fifth portion comprising a fifth dosing frequency, wherein the dosing frequencies of each portion are different. Additional portions can be included in the maintenance phase as desired, such as 6 or more, 7 or more, 8 or more, 9 or more, or 10 or more portions.

The dosing frequency of a particular portion of the maintenance phase may be less frequent, the same frequency, or more frequent than any other portion in the maintenance phase, so long as at least one portion of the maintenance phase comprises a non-daily dosing frequency. In some aspects, the dosing frequency of a portion of the maintenance phase is more frequent than another portion of the maintenance phase. In some aspects, the dosing frequency of a portion of the maintenance phase is less frequent than another portion of the maintenance phase. In some aspects, the dosing frequency of a portion of the maintenance phase is the same as another portion of the maintenance phase, and the two portions having the same dosing frequency can be separated by a third portion with a different dosing frequency.

In some of the methods described herein, at least one portion of the maintenance phase comprises a dosing frequency of less than daily (i.e., non-daily), such as every other day, every third day, every fourth day, every fifth day, every sixth day, twice a week, three times a week, four times a week, five times a week, six times a week, weekly (i.e., once per week), or less than weekly (such as less than once every week to once every four weeks, once every two weeks, once every three weeks, or once every four weeks). The dosing frequency of another portion than the non-daily portion of the maintenance phase may be daily, such as once a day. The dosing frequency of another portion than the non-daily portion of the maintenance phase may be more frequent than daily, such as twice a day.

In some embodiments, the maintenance phase includes a first portion that includes administration of a maintenance dose at a first dosing frequency (e.g., daily, every other day, every third day, every fourth day, every fifth day, every sixth day, once per week, twice per week, three times per week, four times per week, five times per week, six times per week, weekly (i.e., once per week), or less than weekly (such as less than once every week to once every four weeks, once every two weeks, once every three weeks, or once every four weeks), and a second portion that includes administration of the maintenance dose at a second dosing frequency (e.g., daily, every other day, every third day, every fourth day, every fifth day, every sixth day, once per week, twice per week, three times per week, four times per week, five times per week, six times per week, weekly (i.e., once per week), or less than weekly (such as less than once every week to once every four weeks, once every two weeks, once every three weeks, or once every four weeks) wherein the first dosing frequency and the second dosing frequency are different. The first portion of the maintenance phase occurs prior to the second portion of the maintenance phase, which may or may not be separated by a third portion of the maintenance phase. In some embodiments, the first portion of the maintenance phase includes administering the maintenance dose at a higher frequency compared to the second portion of the maintenance phase.

The duration of the maintenance phase is generally about 20 weeks or longer, and may be for the entire life of the patient. For example, in some embodiments, the maintenance phase is about 20 weeks to about 24 weeks, about 24 weeks to about 28 weeks, about 28 weeks to about 32 weeks, about 32 weeks to about 36 weeks, about 36 weeks to about 40 weeks, about 40 weeks to about 44 weeks, about 44 weeks to about 48 weeks, about 48 weeks to about 52 weeks, about 52 weeks to about 60 weeks, about 60 weeks to about 72 weeks, about 72 weeks to about 80 weeks, or more than about 80 weeks, such as the life of the subject.

In some embodiments, a portion of the maintenance phase is between about 1 week and the life of the subject, such as about 1 week to about 4 weeks, about 4 weeks to about 8 weeks, about 8 weeks to about 12 weeks, about 12 weeks to about 16 weeks, about 16 weeks to about 20 weeks, about 20 weeks to about 24 weeks, about 24 weeks to about 28 weeks, about 28 weeks to about 32 weeks, about 32 weeks to about 36 weeks, about 36 weeks to about 40 weeks, about 40 weeks to about 44 weeks, about 44 weeks to about 48 weeks, about 48 weeks to about 52 weeks, about 52 weeks to about 56 weeks, about 56 weeks to about 60 weeks, about 60 weeks to about 72 weeks, about 72 weeks to about 80 weeks, or more than about 80 weeks, such as the life of the subject, or values and ranges therebetween. In some embodiments, different portions of the maintenance phase within the maintenance phase are of the same duration or of different durations.

In one example, the maintenance phase includes administering to a subject on a non-daily basis (e.g., every other day, every third day, every fourth day, every fifth day, every sixth day, once per week, twice per week, three times per week, four times per week, five times per week, six times per week, weekly (i.e., once per week), or less than weekly (such as less than once every week to once every four weeks, once every two weeks, once every three weeks, or once every four weeks) a maintenance phase dose during at least one portion of the maintenance phase or for the entirety of the maintenance phase. In some embodiments, the maintenance phase or the portion of the maintenance phase that includes the non-daily dosing frequency is about 4 weeks or more, including up to the life of the patient (such as about 4 weeks to about 8 weeks, about 8 weeks to about 12 weeks, about 12 weeks to about 16 weeks, about 16 weeks to about 20 weeks, about 20 weeks to about 24 weeks, about 24 weeks to about 28 weeks, about 28 weeks to about 32 weeks, about 32 weeks to about 36 weeks, about 36 weeks to about 40 weeks, about 40 weeks to about 44 weeks, about 44 weeks to about 48 weeks, about 48 weeks to about 52 weeks, about 52 weeks to about 56 weeks, about 56 weeks to about 60 weeks, about 60 weeks to about 72 weeks, about 72 weeks to about 80 weeks, or more than about 80 weeks).

In some embodiments, the maintenance phase includes a first portion comprising a first non-daily (e.g., every other day, every third day, every fourth day, every fifth day, every sixth day, once per week, twice per week, three times per week, four times per week, five times per week, six times per week, weekly (i.e., once per week), or less than weekly (such as less than once every week to once every four weeks, once every two weeks, once every three weeks, or once every four weeks) administration of the maintenance phase dose and a second portion comprising non-daily (e.g., every other day, every third day, every fourth day, every fifth day, every sixth day, once per week, twice per week, three times per week, four times per week, five times per week, six times per week, weekly (i.e., once per week), or less than weekly (such as less than once every week to once every four weeks, once every two weeks, once every three weeks, or once every four weeks) administration of the maintenance phase dose, wherein the frequency of administration of the maintenance phase dose during the first portion and the second portion are different. In some embodiments, the first portion of the maintenance phase is about 1 week to about 80 weeks (such as about 1 week to about 4 weeks, about 4 weeks to about 8 weeks, about 8 weeks to about 12 weeks, about 12 weeks to about 16 weeks, about 16 weeks to about 20 weeks, about 20 weeks to about 24 weeks, about 24 weeks to about 28 weeks, about 28 weeks to about 32 weeks, about 32 weeks to about 36 weeks, about 36 weeks to about 40 weeks, about 40 weeks to about 44 weeks, about 44 weeks to about 48 weeks, about 48 weeks to about 52 weeks, about 52 weeks to about 56 weeks, about 56 weeks to about 60 weeks, about 60 weeks to about 72 weeks, or about 72 weeks to about 80 weeks). In some embodiments, the second portion of the maintenance phase is about 4 weeks or more, including up to the life of the patient (such as about 4 weeks to about 8 weeks, about 8 weeks to about 12 weeks, about 12 weeks to about 16 weeks, about 16 weeks to about 20 weeks, about 20 weeks to about 24 weeks, about 24 weeks to about 28 weeks, about 28 weeks to about 32 weeks, about 32 weeks to about 36 weeks, about 36 weeks to about 40 weeks, about 40 weeks to about 44 weeks, about 44 weeks to about 48 weeks, about 48 weeks to about 52 weeks, about 52 weeks to about 56 weeks, about 56 weeks to about 60 weeks, about 60 weeks to about 72 weeks, about 72 weeks to about 80 weeks, or more than about 80 weeks).

In some embodiments, the maintenance phase includes a first portion comprising daily administration of the maintenance phase dose and a second portion comprising non-daily (e.g., every other day, every third day, every fourth day, every fifth day, every sixth day, once per week, twice per week, three times per week, four times per week, five times per week, six times per week, weekly (i.e., once per week), or less than weekly (such as less than once every week to once every four weeks, once every two weeks, once every three weeks, or once every four weeks) administration of the maintenance phase dose. In some embodiments, the first portion of the maintenance phase occurs prior to the second portion of the maintenance phase. In some embodiments, the first portion of the maintenance phase occurs immediately prior to the second portion of the maintenance phase. In some embodiments, the first portion of the maintenance phase is about 1 week to about 80 weeks (such as about 1 week to about 4 weeks, about 4 weeks to about 8 weeks, about 8 weeks to about 12 weeks, about 12 weeks to about 16 weeks, about 16 weeks to about 20 weeks, about 20 weeks to about 24 weeks, about 24 weeks to about 28 weeks, about 28 weeks to about 32 weeks, about 32 weeks to about 36 weeks, about 36 weeks to about 40 weeks, about 40 weeks to about 44 weeks, about 44 weeks to about 48 weeks, about 48 weeks to about 52 weeks, about 52 weeks to about 56 weeks, about 56 weeks to about 60 weeks, about 60 weeks to about 72 weeks, or about 72 weeks to about 80 weeks). In some embodiments, the second portion of the maintenance phase is about 4 weeks or more, including up to the life of the patient (such as about 4 weeks to about 8 weeks, about 8 weeks to about 12 weeks, about 12 weeks to about 16 weeks, about 16 weeks to about 20 weeks, about 20 weeks to about 24 weeks, about 24 weeks to about 28 weeks, about 28 weeks to about 32 weeks, about 32 weeks to about 36 weeks, about 36 weeks to about 40 weeks, about 40 weeks to about 44 weeks, about 44 weeks to about 48 weeks, about 48 weeks to about 52 weeks, about 52 weeks to about 56 weeks, about 56 weeks to about 60 weeks, about 60 weeks to about 72 weeks, about 72 weeks to about 80 weeks, or more than about 80 weeks). In one example, the maintenance phase includes daily administration of the maintenance phase dose for about 4 weeks, followed by twice weekly administration of the maintenance phase dose for about 24 weeks. In another example, the maintenance phase includes daily administration of the maintenance phase dose for about 28 weeks, followed by twice weekly administration of the maintenance phase dose for about 24 weeks.

In some embodiments, the maintenance phase includes a first portion comprising non-daily (e.g., every other day, every third day, every fourth day, every fifth day, every sixth day, once per week, twice per week, three times per week, four times per week, five times per week, six times per week, weekly (i.e., once per week), or less than weekly (such as less than once every week to once every four weeks, once every two weeks, once every three weeks, or once every four weeks) administration of the maintenance phase dose, a second portion comprising non-daily (e.g., every other day, every third day, every fourth day, every fifth day, every sixth day, once per week, twice per week, three times per week, four times per week, five times per week, six times per week, weekly (i.e., once per week), or less than weekly (such as less than once every week to once every four weeks, once every two weeks, once every three weeks, or once every four weeks) administration of the maintenance phase dose, a third portion comprising non-daily (e.g., every other day, every third day, every fourth day, every fifth day, every sixth day, once per week, twice per week, three times per week, four times per week, five times per week, six times per week, weekly (i.e., once per week), or less than weekly (such as less than once every week to once every four weeks, once every two weeks, once every three weeks, or once every four weeks) administration of the maintenance phase dose, and a fourth portion comprising non-daily (e.g., every other day, every third day, every fourth day, every fifth day, every sixth day, once per week, twice per week, three times per week, four times per week, five times per week, six times per week, weekly (i.e., once per week), or less than weekly (such as less than once every week to once every four weeks, once every two weeks, once every three weeks, or once every four weeks) administration of the maintenance phase dose, wherein at least two (or three or four) of the portion include administration of the maintenance dose at different frequencies. In some embodiments, the first portion of the maintenance phase is about 1 week or more (such as about 1 week to about 4 weeks, about 4 weeks to about 8 weeks, about 8 weeks to about 12 weeks, about 12 weeks to about 16 weeks, about 16 weeks to about 20 weeks, about 20 weeks to about 24 weeks, about 24 weeks to about 28 weeks, about 28 weeks to about 32 weeks, about 32 weeks to about 36 weeks, about 36 weeks to about 40 weeks, about 40 weeks to about 44 weeks, about 44 weeks to about 48 weeks, about 48 weeks to about 52 weeks, about 52 weeks to about 56 weeks, about 56 weeks to about 60 weeks, about 60 weeks to about 72 weeks, or about 72 weeks to about 80 weeks). In some embodiments, the second portion of the maintenance phase is about 1 week or more (such as about 1 week to about 4 weeks, about 4 weeks to about 8 weeks, about 8 weeks to about 12 weeks, about 12 weeks to about 16 weeks, about 16 weeks to about 20 weeks, about 20 weeks to about 24 weeks, about 24 weeks to about 28 weeks, about 28 weeks to about 32 weeks, about 32 weeks to about 36 weeks, about 36 weeks to about 40 weeks, about 40 weeks to about 44 weeks, about 44 weeks to about 48 weeks, about 48 weeks to about 52 weeks, about 52 weeks to about 56 weeks, about 56 weeks to about 60 weeks, about 60 weeks to about 72 weeks, or about 72 weeks to about 80 weeks). In some embodiments, the third portion of the maintenance phase is about 1 week or more (such as about 1 week to about 4 weeks, about 4 weeks to about 8 weeks, about 8 weeks to about 12 weeks, about 12 weeks to about 16 weeks, about 16 weeks to about 20 weeks, about 20 weeks to about 24 weeks, about 24 weeks to about 28 weeks, about 28 weeks to about 32 weeks, about 32 weeks to about 36 weeks, about 36 weeks to about 40 weeks, about 40 weeks to about 44 weeks, about 44 weeks to about 48 weeks, about 48 weeks to about 52 weeks, about 52 weeks to about 56 weeks, about 56 weeks to about 60 weeks, about 60 weeks to about 72 weeks, or about 72 weeks to about 80 weeks). In some embodiments, the fourth portion of the maintenance phase is about 1 week or more, or about 4 weeks or more, including up to the life of the patient (such as about 1 week to about 4 weeks, about 4 weeks to about 8 weeks, about 8 weeks to about 12 weeks, about 12 weeks to about 16 weeks, about 16 weeks to about 20 weeks, about 20 weeks to about 24 weeks, about 24 weeks to about 28 weeks, about 28 weeks to about 32 weeks, about 32 weeks to about 36 weeks, about 36 weeks to about 40 weeks, about 40 weeks to about 44 weeks, about 44 weeks to about 48 weeks, about 48 weeks to about 52 weeks, about 52 weeks to about 56 weeks, about 56 weeks to about 60 weeks, about 60 weeks to about 72 weeks, about 72 weeks to about 80 weeks, or more than about 80 weeks). The first portion occurs prior to the second portion, which occurs prior to the third portion, which occurs prior to the fourth portion. In some embodiments, the frequency of administration of the maintenance dose decreases between portions of the maintenance phase (i.e., administration during the first portion is more frequent than administration during the second portion, which is more frequent than the third portion).

In some embodiments, the maintenance phase includes a first portion comprising daily administration of the maintenance phase dose, a second portion comprising non-daily (e.g., every other day, every third day, every fourth day, every fifth day, every sixth day, once per week, twice per week, three times per week, four times per week, five times per week, six times per week, weekly (i.e., once per week), or less than weekly (such as less than once every week to once every four weeks, once every two weeks, once every three weeks, or once every four weeks) administration of the maintenance phase dose, a third portion comprising non-daily (e.g., every other day, every third day, every fourth day, every fifth day, every sixth day, once per week, twice per week, three times per week, four times per week, five times per week, six times per week, weekly (i.e., once per week), or less than weekly (such as less than once every week to once every four weeks, once every two weeks, once every three weeks, or once every four weeks) administration of the maintenance phase dose, and a fourth portion comprising non-daily (e.g., every other day, every third day, every fourth day, every fifth day, every sixth day, once per week, twice per week, three times per week, four times per week, five times per week, six times per week, weekly (i.e., once per week), or less than weekly (such as less than once every week to once every four weeks, once every two weeks, once every three weeks, or once every four weeks) administration of the maintenance phase dose, wherein at least two (or three or four) of the portions include administration of the maintenance dose at different frequencies. In some embodiments, the first portion of the maintenance phase is about 1 week or more (such as about 1 week to about 4 weeks, about 4 weeks to about 8 weeks, about 8 weeks to about 12 weeks, about 12 weeks to about 16 weeks, about 16 weeks to about 20 weeks, about 20 weeks to about 24 weeks, about 24 weeks to about 28 weeks, about 28 weeks to about 32 weeks, about 32 weeks to about 36 weeks, about 36 weeks to about 40 weeks, about 40 weeks to about 44 weeks, about 44 weeks to about 48 weeks, about 48 weeks to about 52 weeks, about 52 weeks to about 56 weeks, about 56 weeks to about 60 weeks, about 60 weeks to about 72 weeks, or about 72 weeks to about 80 weeks). In some embodiments, the second portion of the maintenance phase is about 1 week or more (such as about 1 week to about 4 weeks, about 4 weeks to about 8 weeks, about 8 weeks to about 12 weeks, about 12 weeks to about 16 weeks, about 16 weeks to about 20 weeks, about 20 weeks to about 24 weeks, about 24 weeks to about 28 weeks, about 28 weeks to about 32 weeks, about 32 weeks to about 36 weeks, about 36 weeks to about 40 weeks, about 40 weeks to about 44 weeks, about 44 weeks to about 48 weeks, about 48 weeks to about 52 weeks, about 52 weeks to about 56 weeks, about 56 weeks to about 60 weeks, about 60 weeks to about 72 weeks, or about 72 weeks to about 80 weeks). In some embodiments, the third portion of the maintenance phase is about 1 week or more (such as about 1 week to about 4 weeks, about 4 weeks to about 8 weeks, about 8 weeks to about 12 weeks, about 12 weeks to about 16 weeks, about 16 weeks to about 20 weeks, about 20 weeks to about 24 weeks, about 24 weeks to about 28 weeks, about 28 weeks to about 32 weeks, about 32 weeks to about 36 weeks, about 36 weeks to about 40 weeks, about 40 weeks to about 44 weeks, about 44 weeks to about 48 weeks, about 48 weeks to about 52 weeks, about 52 weeks to about 56 weeks, about 56 weeks to about 60 weeks, about 60 weeks to about 72 weeks, or about 72 weeks to about 80 weeks). In some embodiments, the fourth portion of the maintenance phase is about 1 week or more, such as about 4 weeks or more, including up to the life of the patient (such as about 4 weeks to about 8 weeks, about 8 weeks to about 12 weeks, about 12 weeks to about 16 weeks, about 16 weeks to about 20 weeks, about 20 weeks to about 24 weeks, about 24 weeks to about 28 weeks, about 28 weeks to about 32 weeks, about 32 weeks to about 36 weeks, about 36 weeks to about 40 weeks, about 40 weeks to about 44 weeks, about 44 weeks to about 48 weeks, about 48 weeks to about 52 weeks, about 52 weeks to about 56 weeks, about 56 weeks to about 60 weeks, about 60 weeks to about 72 weeks, about 72 weeks to about 80 weeks, or more than about 80 weeks). The first portion occurs prior to the second portion, which occurs prior to the third portion, which occurs prior to the fourth portion. In some embodiments, the frequency of administration of the maintenance dose decreases between portions of the maintenance phase (i.e., administration during the first portion is more frequent than administration during the second portion, which is more frequent than the third portion, which is more frequent than the fourth portion).

In one example, the first portion of the maintenance phase includes administering the maintenance dose on a daily basis for about 28 weeks, the second portion of the maintenance dose includes administering the maintenance dose every other day for about 4 weeks, the third portion of the maintenance dose includes administering the maintenance dose twice weekly for about 24 weeks, and the fourth portion includes administering the maintenance dose weekly for about 28 weeks. In another example, the first portion of the maintenance phase includes administering the maintenance dose on a daily basis for about 52 weeks, the second portion of the maintenance dose includes administering the maintenance dose every other day for about 4 weeks, the third portion of the maintenance dose includes administering the maintenance dose twice weekly for about 24 weeks, and the fourth portion includes administering the maintenance dose weekly for about 28 weeks.

In some embodiments, the dosing frequency of a first portion of the maintenance phase is daily, the dosing frequency of a second portion of the maintenance phase is every other day, and the dosing frequency of a third portion is twice weekly.

In some embodiments, the dosing frequency of a first portion of the maintenance phase is daily, the dosing frequency of a second portion of the maintenance phase is every other day, the dosing frequency of a third portion is twice weekly, and the dosing frequency of a fourth portion is weekly, once every two weeks, once every three weeks, or once every four weeks.

In some embodiments, the maintenance phase dose is administered to the subject every other day during a portion of the maintenance phase. In some embodiments, the maintenance phase dose is administered to the subject every other day for about 4 weeks or more during a portion of the maintenance phase.

In some embodiments, the maintenance phase dose is administered to the subject twice a week during a portion of the maintenance phase. In some embodiments, the maintenance phase dose is administered to the subject twice a week for about 20 weeks or more during the maintenance phase.

In some embodiments, the maintenance phase dose is administered to the subject every other day during a portion prior to the maintenance phase dose being administered to the subject twice a week.

In some embodiments, the maintenance phase dose is administered to the subject once a week during at least a portion of the maintenance phase. In some embodiments, the maintenance phase dose is administered to the subject once a week for about 28 weeks or more during the maintenance phase dose.

In some embodiments, the maintenance phase dose is administered to the subject once a week during at least a portion of the maintenance phase following more frequent administration of the maintenance phase dose.

In some embodiments, the maintenance phase dose is administered to the subject daily during at least a portion of the maintenance phase. In some embodiments, the maintenance phase dose is administered to the subject daily for about 6 months to about 2 years during the maintenance phase, such as about 6 months, about 6 months to about 12 months, about 12 months to about 18 months, or about 18 months to about 2 years.

In some embodiments, the maintenance phase dose is administered to the subject daily during the maintenance phase prior to the dose being administered to the subject non-daily during the maintenance phase.

In a non-limiting exemplary embodiment, a subject receives a maintenance phase dose daily for about 24 weeks, followed by a maintenance phase dose every other day for about 4 weeks, followed by a twice a week maintenance phase dose indefinitely.

In another non-limiting exemplary embodiment, a subject receives a maintenance phase dose daily for about 52 weeks, followed by a dose every other day for about 4 weeks, followed by a twice a week maintenance dose indefinitely.

In another non-limiting exemplary embodiment, a subject receives a maintenance phase dose daily for about 52 weeks, followed by a maintenance dose every other day for about 4 weeks, followed by a twice a week dose twice a week for about 24 weeks, followed by a weekly maintenance phase dose indefinitely.

In another non-limiting exemplary embodiment, a subject receives a maintenance phase dose daily for about 24 weeks, followed by a twice a week maintenance phase dose indefinitely.

In another non-limiting exemplary embodiment, a subject receives a maintenance phase dose daily for about 24 weeks, followed by a maintenance phase dose every other day indefinitely.

In another non-limiting exemplary embodiment, a subject receives a maintenance phase dose daily for about 52 weeks, followed by a maintenance phase dose every other day indefinitely.

In another non-limiting exemplary embodiment, a subject receives a maintenance phase dose daily for about 52 weeks, followed by a maintenance phase dose twice a week indefinitely.

In another non-limiting exemplary embodiment, a subject receives a maintenance phase dose daily for about 24 weeks, followed by a twice a week maintenance phase dose for about 24 weeks, followed by a weekly maintenance phase dose indefinitely.

In another non-limiting exemplary embodiment, a subject receives a maintenance phase dose daily for about 52 weeks daily, followed by a twice a week maintenance phase dose for about 24 weeks, followed by a weekly maintenance phase dose indefinitely.

In another non-limiting exemplary embodiment, a subject receives a maintenance phase dose daily for about 52 weeks daily, followed by a weekly maintenance phase dose indefinitely.

In another non-limiting exemplary embodiment, a subject receives a maintenance phase dose daily for about 24 weeks daily, followed by a maintenance phase dose every other day for about 4 weeks, followed by a twice a week maintenance phase dose for about 24 weeks, followed by a weekly maintenance phase dose indefinitely.

In another non-limiting exemplary embodiment, a subject receives a maintenance phase dose, for at least a portion of the maintenance phase, every other day indefinitely.

In another non-limiting exemplary embodiment, a subject receives a maintenance phase dose, for at least a portion of the maintenance phase, twice a week indefinitely.

In another non-limiting exemplary embodiment, a subject receives a weekly maintenance phase dose, for at least a portion of the maintenance phase, indefinitely.

In another non-limiting exemplary embodiment, a subject receives a maintenance phase dose, for at least a portion of the maintenance phase, between once every week and once every four weeks (such as once every two weeks, once every three weeks, or once every four weeks) indefinitely.

In any of the methods described herein, the frequency of a maintenance phase dose, such as daily, every other day, every third day, every fourth day, every fifth day, every sixth day, once a week, twice a week, three times a week, four times a week, five times a week, six times a week, or less than weekly, may be adjusted, such as more frequent or less frequent, based on the needs of the subject in the judgment of the subject's medical caregiver.

The dosage of peanut protein administered to the subject during the maintenance phase is between about 200 mg and about 1,000 mg peanut protein. For example, in some embodiments, a dose during the maintenance phase is between about 200 mg and about 300 mg peanut protein, about 300 mg and about 500 mg peanut protein, about 500 mg and about 1,000 mg peanut protein, or values and ranges therebetween. In an exemplary embodiment, a maintenance phase dose administered to the subject during the maintenance phase is about 300 mg peanut protein.

In some embodiments, the maintenance phase dose is administered to the subject once per week during at least a portion of the maintenance phase following more frequent administration of the maintenance phase dose, and the maintenance phase dose comprises about 300 mg or more of peanut protein.

In some embodiments, the maintenance phase dose is administered to the subject once per week during at least a portion of the maintenance phase following more frequent administration of the maintenance phase dose, the maintenance phase dose is administered to the subject daily during at least a portion of the maintenance phase, and the maintenance phase dose comprises about 300 mg or more of peanut protein.

In some embodiments, the maintenance phase dose is administered to the subject every other day during at least a portion of the maintenance phase following more frequent administration of the maintenance phase dose, and the maintenance phase dose comprises about 300 mg or more of peanut protein.

In some embodiments, the maintenance phase dose is administered to the subject on a non-daily basis during at least a portion of the maintenance phase, and the maintenance phase dose is administered to the subject for more than 24 weeks.

In some embodiments, the maintenance phase dose is administered to the subject on a non-daily basis during at least a portion of the maintenance phase, the maintenance phase dose is administered to the subject for more than 24 weeks, and the maintenance phase dose comprises about 300 mg or more of peanut protein.

In some embodiments, the maintenance phase dose is administered to the subject on a non-daily basis during at least a portion of the maintenance phase, the maintenance phase dose is administered to the subject for more than 24 weeks, the maintenance phase dose comprises about 300 mg or more of peanut protein, the subject is between about 4 years old and less than 18 years old, the up-dosing phase is between about 3 months and about 2 years in length, and the oral immunotherapy further comprises an initial escalation phase.

Up-Dosing Phase

The up-dosing phase of an oral immunotherapy comprises administering to the patient a series of escalating doses, beginning with a lower dose than the highest dose of the oral immunotherapy and ending with the highest dose of the oral immunotherapy. Each dose in the series of doses is administered periodically, such as daily. Each dose in the series can comprise daily administration of the peanut protein composition for a period of time, such as about 1 week to about 4 weeks, such as about 2 weeks. After the completion of a particular dose in the series for a period of time, treatment can be advanced to a higher dose in the series. In some embodiments, the up-dosing phase of the treatment comprises a series of between 2 and 10 different dose levels. If a subject tolerates a particular dose level during the up-dosing phase for a period of time, the subject can advance to the next dose level in the series of the up-dosing phase. If a subject does not tolerate a particular dose level during the up-dosing phase for a period of time, the subject may repeat the current dose level in the series. Alternatively, if a subject does not tolerate a particular dose level during the up-dosing phase for a period of time, the subject may return to an earlier dose level in the series. The duration of the up-dosing phase therefore depends on the specific responses of the subject. The subject may repeat doses in the series as many times as necessary to achieve the highest dose in the series. The up-dosing phase ends when the highest dose is tolerated for two weeks.

The pharmaceutical composition of peanut protein of a dose administered during the up-dosing phase comprises between about 0.5 mg and about 5,000 mg of peanut protein, such as about 0.5 mg to about 10 mg peanut protein, about 10 mg to about 100 mg peanut protein, about 100 mg to about 300 mg peanut protein, about 300 mg to about 500 mg peanut protein, about 500 mg to about 1,000 mg peanut protein, about 1,000 mg to about 2,000 mg peanut protein, or about 2,000 mg to about 5,000 mg peanut protein and values and ranges therebetween. In a non-limiting exemplary embodiment, the doses of the up-dosing phase are daily administrations of the maximum tolerated dose of the initial escalation phase, such as 3 mg or 6 mg peanut protein, followed by a series of doses of about 12 mg peanut protein, about 20 mg peanut protein, about 40 mg peanut protein, about 80 mg peanut protein, about 120 mg peanut protein, about 160 mg peanut protein, about 200 mg peanut protein, about 240 mg peanut protein, and about 300 mg peanut protein, wherein each dosage level is administered for about 1 week to about 4 weeks (such as about 2 weeks) before advancing to the next dose in the series. In another exemplary embodiment, the doses of the up-dosing phase are daily administrations of the maximum tolerated dose of the initial escalation phase, such as 3 mg or 6 mg peanut protein, followed by a series of escalating daily doses prescribed by a subject's medical caregiver, wherein each daily dose comprises one or more capsules or sachets selected from the group consisting of: 0.5 mg peanut protein capsules, 1 mg peanut protein capsules, 10 mg peanut protein capsules, 20 mg peanut protein capsules, 100 mg peanut protein capsules, or 300 mg peanut protein sachets, wherein each dosage level is administered for about 1 week to about 4 weeks (such as about 2 weeks) before advancing to the next dose in the series.

The series of doses of the up-dosing phase are distinguished by adjustment of the administered dose. The size of the dose in the series of doses of the up-dosing phase are adjusted periodically, such as between once every week and once every six weeks. In some embodiments, the up-dosing phase comprises weekly dose adjustment, dose adjustment every two weeks, dose adjustment every third week, dose adjust every fourth week, dose adjustment every fifth week, dose adjustment every sixth week, or adjustment as needed based on the judgment of the subject's medical caregiver. The dose may be increased to the next scheduled dose in the series, lowered to a previous in the series in response to an allergic adverse event, maintained for an additional interval at the current dose in the series, increased to a higher dose in the series based on the judgment of the subject's medical caregiver, or decreased to a lower dose in the series based on the judgment of the subject's medical caregiver. In some embodiments, the up-dosing phase is adjusted at any time based on the judgment of the subject's medical caregiver that the subject did not tolerate the current dose in the series.

The up-dosing phase proceeds until the subject achieves the final dose in the up-dosing series. In some embodiments, the up-dosing phase is about 1 month to about 6 months, such as about 1 month to about 3 months, or about 3 months to about 6 months. In some embodiments, the up-dosing phase is about 6 months to about 2 years, such as about 6 months to about 1 year, about 1 year to about 18 months, or about 18 months to about 2 years. In a non-limiting exemplary embodiment, the up-dosing phase continues for 22 weeks to 2 years, depending on the number of dose reductions and re-escalations and dose level repeats, through doses of 12 mg peanut protein, 20 mg peanut protein, 40 mg peanut protein, 80 mg peanut protein, 120 mg peanut protein, 160 mg peanut protein, 200 mg peanut protein, 240 mg peanut protein, and terminating at 300 mg peanut protein. In any of the described embodiments, the up-dosing phase terminates when the subject tolerates the scheduled dose of the final dose in the series of the up-dosing phase for 2 weeks, thereby beginning the maintenance phase.

Each dose of the series of the up-dosing phase may be scheduled to last about 1 week, about 2 weeks, about 3 weeks, about 4 weeks, or values and ranges therebetween. Based on the observation of an allergic adverse event, a subject's caregiver may repeat the subject's current dose in up-dosing series. A particular portion with a particular dose may be repeated as many times as necessary, such as once, two times, three times, or four times, or more, to adequately desensitize a subject to that dose, such as when the subject no longer experiences a moderate or serious allergic adverse event upon accidental (or deliberate) exposure to the food allergen.

Initial Escalation Phase

Optionally, the oral immunotherapy includes an initial escalation phase preceding the up-dosing phase. The initial escalation phase can ensure the safety and suitability of oral immunotherapy for a particular subject. The initial escalation phase is administered over a short period, such as one or two days, at an appropriate medical facility, such as a doctor's office or allergy clinic. The subject is usually closely monitored by a medical caregiver, who can provide interventions such as epinephrine, albuterol, and diphenhydramine in the event of an allergic adverse reaction that necessitates intervention. The initial escalation phase of the oral immunotherapy, if present, includes administration of a plurality of small doses of the peanut protein composition to the subject. The small doses can be spaced by a period of time, such as about 10 minutes to about 60 minutes, and can include 1, 2, 3, 4, or 5 or more doses. The initial escalation phase may comprise doses between about 0.5 mg and about 6 mg peanut protein, such as about 0.5 mg to about 1.5 mg peanut protein, about 1.5 mg to about 3 mg peanut protein, or about 3 mg to about 6 mg peanut protein. In a non-limiting example, the initial escalation phase comprises an incremental escalation over one day from about 0.5 mg peanut protein to a maximum of about 6 mg peanut protein in a single day, with single doses of about 0.5 mg, about 1 mg, about 1.5 mg, about 3 mg, and about 6 mg of peanut protein, wherein tolerance of the 3 mg or 6 mg peanut protein dose indicates the subject can safely proceed to an up-dosing phase of an oral immunotherapy.

Adjusting the Maintenance Dose Frequency

Occasionally, a subject undergoing a peanut OIT may experience treatment-related allergic adverse events when a maintenance dose is administered to the subject during the maintenance phase. Described herein are methods of treating a subject for a peanut allergy by an oral immunotherapy comprising an up-dosing phase and a maintenance phase, the method comprising administering to the subject on a non-daily basis a maintenance phase dose, observing at least one allergic adverse event in the subject receiving a maintenance phase dose of peanut protein as part of an oral immunotherapy, and increasing the frequency of administration of the maintenance phase dose, such as from a non-daily administration to a more frequent non-daily, daily, or more than daily administration, during the maintenance phase of the oral immunotherapy. In some embodiments, the method further includes monitoring the subject for the at least one allergic adverse event.

A subject's medical caregiver (e.g., a physician, a nurse, a pharmacist, or an allergist) may observe the allergic adverse event, although the allergic adverse event can be observed by the patient or any other person (such as a parent, guardian, etc.). In some embodiments, a subject's medical caregiver directly observes the event, for example by visual observation or by clinical assay. In some embodiments, the subject reports the symptom to the subject's medical caregiver.

In some embodiments, the number of mild allergic adverse events experienced by a subject receiving a maintenance phase dose of peanut protein indicates a need to either decrease the dose level for a period of time, or increase the frequency (decrease the interval between doses) of administration of the maintenance phase dose to a more frequent maintenance phase dose. In some embodiments, the number of mild allergic adverse events indicating a need to increase the frequency of the maintenance phase dose to a more frequent maintenance phase dose is more than 1 mild allergic adverse event, such as 2 or more, 3 or more, 4 or more, or 5 or more mild allergic adverse events, wherein the adjusted frequency of the maintenance phase dose reduces the probability of additional mild allergic adverse events.

In some embodiments, the number of moderate allergic adverse events experienced by a subject receiving a maintenance phase dose of peanut protein indicates a need to either decrease the dose level for a period of time, or increase the frequency of administration of the maintenance phase dose to a more frequent maintenance phase dose. In some embodiments, the number of moderate allergic adverse events indicating a need to increase the frequency of the maintenance phase dose to a more frequent administration of the maintenance phase dose is more than 1 moderate allergic adverse event, such as 2 or more, 3 or more, 4 or more, or 5 or more moderate allergic adverse events, wherein the adjusted frequency of the maintenance phase dose reduces the probability of additional moderate allergic adverse events.

In some embodiments, the observation of at least one serious allergic adverse events experienced by a subject receiving a maintenance phase dose indicates a need to either decrease the dose level for a period of time, or increase the frequency of administration of the maintenance phase dose to a more frequent maintenance phase dose, wherein the adjusted frequency of the maintenance phase dose reduces the probability of additional serious allergic adverse events.

In some embodiments, the number of mild and moderate allergic adverse events experienced by a subject receiving a maintenance phase dose indicates a need to either decrease the dose level for a period of time, or increase the frequency of administration of the maintenance phase dose to a more frequent administration of the maintenance phase dose. In some embodiments, the number of mild and moderate allergic adverse events indicating a need to adjust the frequency of administration of the maintenance phase dose to a more frequent administration of the maintenance phase dose is more than 2 mild or moderate allergic adverse event, such as 3 or more, 4 or more, or 5 or more mild or moderate allergic adverse events, wherein the adjusted frequency of the maintenance phase dose reduces the probability of additional mild or moderate allergic adverse events.

In some embodiments, the frequency of administration of the maintenance phase dose to be increased is a non-daily administration and the frequency after increase is a daily administration. In some embodiments, the frequency of administration of the maintenance phase dose to be increased is a non-daily administration and the frequency after increase is a non-daily administration. In some embodiments, the frequency after increase is a non-daily administration of a dose every other day. In some embodiments, the frequency after increase is a non-daily administration of a dose every third day. In some embodiments, the frequency after increase is a non-daily administration of a dose every fourth day. In some embodiments, the frequency after increase is a non-daily administration of a dose every fifth day. In some embodiments, the frequency after increase is a non-daily administration of a dose every sixth day. In some embodiments, the frequency after increase is a non-daily administration of a dose once a week. In some embodiments, the frequency after increase is a non-daily administration of a dose twice a week. In some embodiments, the frequency after increase is a non-daily administration of a dose three times a week. In some embodiments, the frequency after increase is a non-daily administration of a dose four times a week. In some embodiments, the frequency after increase is a non-daily administration of a dose five times a week. In some embodiments, the frequency after increase is a non-daily administration of a dose six times a week. In some embodiments, the frequency after increase is a non-daily administration of a dose about every other week. In some embodiments, the frequency after increase is a non-daily administration of a dose about every third week.

An allergic adverse event can be any clinical symptom that is known or suspected to be related to ingestion, administration, or other contact with an allergen. The allergic adverse event may be any clinical symptom known in the art to be associated with response to peanut protein in subjects with peanut allergy, such as an allergic reaction to peanut protein, including, but not limited to, respiratory symptoms (including couching, shortness of breath, wheezing, rhinorrhea, watery eyes, itching eyes, itching nose, and eosinophilic esophagitis); cutaneous symptoms (including urticarial, angioedema, pruritus); gastrointestinal symptoms (including digestive disturbances such as vomiting, diarrhea, abdominal pain, and eosinophilic gastroenteritis); and/or cardiovascular symptoms (including palpitations). In some embodiments, an allergic adverse event may be any clinical symptom in a subject that a subject's medical caregiver in their judgment, based on their professional experience, determines is likely to be related to exposure to peanut protein including, without limitation, migraine, asthma, allergic rhinitis, conjunctivitis, eczema, drowsiness, hyperactivity in children, tinnitus, recurrent sinusitis, and anaphylaxis.

In one aspect, a subject's medical caregiver who observes an allergic adverse event or receives a report of an allergic adverse event from the subject will, based on their professional experience, determine whether the allergic adverse event is likely or not likely related to the peanut protein oral immunotherapy, wherein a treatment-related allergic adverse event indicates the daily maintenance phase dose should be adjusted to a non-daily maintenance phase dose.

The dosage of peanut protein administered to the subject during the maintenance phase is between about 200 mg and about 1,000 mg peanut protein. For example, in some embodiments, a dose during the maintenance phase is between about 200 mg and about 300 mg peanut protein, about 300 mg and about 500 mg peanut protein, about 500 mg and about 1,000 mg peanut protein, or values and ranges therebetween. In an exemplary embodiment, a maintenance phase dose administered to the subject during the maintenance phase is about 300 mg peanut protein.

Compositions for Oral Immunotherapy

Exemplary compositions for treating peanut allergy are described in detail in U.S. Publication No. 2014/0271721, the contents of which are incorporated by reference herein in its entirety. Exemplary methods for preparing peanut protein formulations are described in detail in U.S. Publication No. 2014/0271836, the contents of which are incorporated by reference herein in its entirety.

A subject having a peanut allergy can be treated for the peanut allergy by administering a series of doses of a peanut protein composition to the subject during the course of a peanut protein oral immunotherapy. The peanut protein composition is preferably a pharmaceutical composition comprising one or more peanut allergen proteins for treating peanut allergy. In some embodiments, peanut proteins may be isolated from peanut flour and, optionally, further comprise one or more diluents, one or more glidants, and one or more lubricants. In some embodiments, the pharmaceutical composition of peanut protein comprises between about 0.05% to about 100% w/w of peanut protein.

In some embodiments, the pharmaceutical composition of peanut protein comprises characterized peanut protein. In some embodiments the characterized peanut protein comprises characterized peanut allergen proteins Ara h1, Ara h2, and/or Ara h6. In one embodiment, a final formulation for treating peanut allergy comprises peanut flour, comprising characterized peanut allergen proteins Ara h1, Ara h2, and/or Ara h6, formulated with a diluent, a glidant, and a lubricant in graduated doses comprising capsules containing between about 0.5 and about 5,000 mg of peanut protein for administration in up-dosing, maintenance, and/or initial escalation phases of an oral immunotherapy.

In any of the methods described herein, the pharmaceutical composition of peanut protein for administration in a maintenance phase of an oral immunotherapy may comprise a dose of between about 200 mg to about 1,000 mg peanut protein, such as between about 200 mg and about 250 mg peanut protein, about 250 mg and about 300 mg peanut protein, about 300 mg and about 500 mg peanut protein, and about 500 mg and about 1,000 mg peanut protein. In a non-limiting preferred embodiment, the dose of peanut protein for administration in the maintenance phase of an oral immunotherapy is about 300 mg peanut protein.

In some embodiments, the pharmaceutical composition of peanut protein for administration in an up-dosing phase of an oral immunotherapy comprises between about 0.5 mg and about 5,000 mg peanut protein, such as individual doses in a series of about 3 mg, about 6 mg, about 10 mg, about 12 mg, about 20 mg, about 40 mg, about 80 mg, about 100 mg, about 120 mg, about 160 mg, about 200 mg, about 240 mg, and about 300 mg peanut protein. In a non-limiting exemplary embodiment, the doses of peanut protein for administration in an up-dosing phase of an oral immunotherapy are daily administration of the maximum tolerated dose of the initial escalation phase, such as about 3 mg peanut protein or about 6 mg peanut protein, followed by a series of escalating daily doses prescribed by a subject's medical caregiver, wherein each daily dose comprises one or more capsules or sachets selected from the group consisting of: about 0.5 mg peanut protein capsules, about 1 mg peanut protein capsules, about 10 mg peanut protein capsules, about 20 mg peanut protein capsules, about 100 mg peanut protein capsules, or about 300 mg peanut protein sachets, wherein each dosage level is administered for about 1 week to about 4 weeks (such as about 2 weeks) before advancing to the next dose.

In the methods described herein, an oral immunotherapy may optionally comprise an initial escalation phase. In some embodiments, the pharmaceutical composition of peanut protein for administration in an initial escalation phase of an oral immunotherapy comprises between about 0.5 and about 6 mg of peanut protein, such as individual doses of about 0.5 mg, about 1 mg, about 1.5 mg, about 3 mg, and about 6 mg peanut protein. In some embodiments, the pharmaceutical composition of peanut protein for administration in an initial escalation phase of an oral immunotherapy comprises between about 0.5 and about 6 mg of peanut protein, such as individual doses of about 0.5 mg, about 1 mg, about 1.5 mg, about 3 mg, about 6 mg, and about 12 mg peanut protein.

EXEMPLARY EMBODIMENTS

The following embodiments are exemplary and not intended to limit the scope of the invention described herein.

Embodiment 1

A method of treating a subject for a peanut allergy by an oral immunotherapy comprising an up-dosing phase and a maintenance phase, the method comprising administering to the subject on a non-daily basis a maintenance phase dose during at least a portion of the maintenance phase.

Embodiment 2

The method of embodiment 1, wherein the maintenance phase dose is administered to the subject at a frequency between less than once per day and once every four weeks for at least a portion of the maintenance phase.

Embodiment 3

The method of embodiment 1, wherein the maintenance phase dose is administered to the subject every other day, every third day, every fourth day, every fifth day, every sixth day, once per week, twice a week, three times a week, four times a week, five times a week, six times a week, once every two weeks, once every three weeks, or once every four weeks for at least a portion of the maintenance phase.

Embodiment 4

The method of embodiment 1, wherein the maintenance phase dose is administered to the subject every other day for at least a portion of the maintenance phase.

Embodiment 5

The method of embodiment 4, wherein the maintenance phase dose is administered to the subject every other day for about 4 weeks or more during at least a portion of the maintenance phase.

Embodiment 6

The method of any one of embodiments 1-5, wherein the maintenance phase dose is administered to the subject twice a week during at least a portion of the maintenance phase.

Embodiment 7

The method of embodiment 6, wherein the maintenance phase dose is administered to the subject twice a week for about 20 weeks or more during at least a portion of the maintenance phase.

Embodiment 8

The method of embodiment 6 or 7, wherein the maintenance phase dose is administered to the subject every other day prior to the maintenance phase dose being administered to the subject twice a week.

Embodiment 9

The method of any one of embodiments 1-8, wherein the maintenance phase dose is administered to the subject for more than 24 weeks.

Embodiment 10

The method of any one of embodiments 1-9, wherein the maintenance phase dose is administered to the subject for about 52 weeks or more.

Embodiment 11

The method of any one of embodiments 1-10, wherein the maintenance phase dose is administered to the subject for about 52 weeks to about 108 weeks.

Embodiment 12

The method of any one of embodiments 1-11, wherein the subject does not tolerate a dose of about 1000 mg peanut protein after 24 weeks of the maintenance phase.

Embodiment 13

The method of any one of embodiments 1-12, wherein the subject tolerates a dose of about 2000 mg peanut protein after 24 weeks of the maintenance phase.

Embodiment 14

The method of any one of embodiments 1-13, wherein the subject tolerates a cumulative dose of about 4043 mg peanut protein at the completion of the maintenance phase.

Embodiment 15

The method of any one of embodiments 1-14, wherein the maintenance phase dose is administered to the subject once per week during at least a portion of the maintenance phase.

Embodiment 16

The method of embodiment 15, wherein the maintenance phase dose is administered to the subject once per week for about 28 weeks or more during at least a portion of the maintenance phase.

Embodiment 17

The method of embodiment 15 or 16, wherein the maintenance dose is administered to the subject once per week during at least a portion of the maintenance phase following more frequent administration of the maintenance phase dose.

Embodiment 18

The method of any one of embodiments 1-17, wherein the maintenance phase dose is administered to the subject on a daily basis during at least a portion of the maintenance phase.

Embodiment 19

The method of embodiment 18, wherein the maintenance phase dose is administered to the subject on a daily basis for about 6 months or more during the maintenance phase.

Embodiment 20

The method of embodiment 18 or 19, wherein the maintenance phase dose is administered to the subject on a daily basis for about 6 months to about 2 years during the maintenance phase.

Embodiment 21

The method of any one of embodiments 18-20, wherein the maintenance phase dose is administered to the subject on a daily basis during the maintenance phase prior to the maintenance phase dose being administered to the subject on a non-daily basis during the maintenance phase.

Embodiment 22

The method of any one of embodiments 1-21, wherein the maintenance phase dose is administered to the subject at a first frequency during a first portion of the maintenance phase, and at a second frequency during a second portion of maintenance phase, wherein the first frequency or the second frequency is a non-daily frequency.

Embodiment 23

The method of embodiment 22, wherein the first frequency or the second frequency is a frequency between less than once per day and once every four weeks.

Embodiment 24

The method of embodiment 22 or 23, wherein the first frequency or the second frequency is every other day, every third day, every fourth day, every fifth day, every sixth day, once per week, twice a week, three times a week, four times a week, five times a week, six times a week, once every two weeks, once every three weeks, or once every four weeks.

Embodiment 25

A method of treating a subject for a peanut allergy by an oral immunotherapy, comprising administering to the subject peanut protein according to an oral immunotherapy schedule comprising an up-dosing phase and a maintenance phase, the maintenance phase comprising administering to the subject a maintenance phase dose for more than 24 weeks.

Embodiment 26

The method of embodiment 25, wherein the maintenance phase dose is administered on a daily basis for at least a portion of the maintenance phase.

Embodiment 27

The method of embodiment 25 or 26, wherein the maintenance phase dose is administered to the subject for about 28 weeks or more.

Embodiment 28

The method of any one of embodiments 25-27, wherein the maintenance phase dose is administered to the subject for about 52 weeks or more.

Embodiment 29

The method of any one of embodiments 25-28, wherein the maintenance phase dose is administered to the subject for about 52 weeks to about 108 weeks.

Embodiment 30

The method of any one of embodiments 25-29, wherein the subject does not tolerate a dose of about 1000 mg peanut protein after 24 weeks of the maintenance phase.

Embodiment 31

The method of any one of embodiments 25-30, wherein the subject tolerates a dose of about 2000 mg peanut protein at the completion of the maintenance phase.

Embodiment 32

The method of any one of embodiments 25-31, wherein the subject tolerates a cumulative dose of about 4043 mg at the completion of the maintenance phase.

Embodiment 33

The method of any one of embodiments 25-32, wherein the maintenance phase dose is administered to the subject on a non-daily basis during at least a portion of the maintenance phase.

Embodiment 34

The method of embodiment 33, wherein the maintenance phase dose is administered to the subject at a frequency between less than once per day and once every four weeks for at least a portion of the maintenance phase.

Embodiment 35

The method of embodiment 33, wherein the maintenance phase dose is administered to the subject every other day, every third day, every fourth day, every fifth day, every sixth day, once per week, twice a week, three times a week, four times a week, five times a week, six times a week, once every two weeks, once every three weeks, or once every four weeks for at least a portion of the maintenance phase.

Embodiment 36

The method of embodiment 33, wherein the maintenance phase dose is administered to the subject every other day for at least a portion of the maintenance phase.

Embodiment 37

The method of embodiment 36, wherein the maintenance phase dose is administered to the subject every other day for about 4 weeks or more during at least a portion of the maintenance phase.

Embodiment 38

The method of any one of embodiments 33-37, wherein the maintenance phase dose is administered to the subject twice a week during at least a portion of the maintenance phase.

Embodiment 39

The method of embodiment 38, wherein the maintenance phase dose is administered to the subject twice a week for about 20 weeks or more during at least a portion of the maintenance phase.

Embodiment 40

The method of any one of embodiments 1-39, wherein the maintenance phase dose comprises about 300 mg or more of peanut protein.

Embodiment 41

The method of any one of embodiments 1-40, wherein the maintenance phase dose comprises about 300 mg of peanut protein.

Embodiment 42

The method of any one of embodiments 1-41, wherein the subject is about 12 months old or older.

Embodiment 43

The method of any one of embodiments 1-42, wherein the subject is about 4 years old or older.

Embodiment 44

The method of embodiment 42 or 43, wherein the subject is between about 4 years old and about 17 years old.

Embodiment 45

The method of any one of embodiments 1-44, wherein the up-dosing phase comprises administering to the subject two or more different doses between about 3 mg and about the dose of the initial maintenance phase dose.

Embodiment 46

The method of any one of embodiments 1-45, wherein the up-dosing phase is between about 3 months and about 2 years in length.

Embodiment 47

The method of any one of embodiments 1-46, wherein the oral immunotherapy further comprises an initial escalation phase.

Embodiment 48

The method of any one of embodiments 1-47, further comprising monitoring the subject for an allergic adverse event.

Embodiment 49

The method of embodiment 48, wherein the allergic adverse event is an allergic reaction to peanut protein.

Embodiment 50

A method of treating a subject for a peanut allergy by an oral immunotherapy comprising an up-dosing phase and a maintenance phase, the method comprising:
    administering to the subject on a non-daily basis a maintenance phase dose;
    observing at least one allergic adverse event in the subject receiving a non-daily maintenance phase dose of peanut protein as part of an oral immunotherapy; and
    increasing the frequency of administration of the maintenance phase dose during the maintenance phase of the oral immunotherapy in response to the observed at least one allergic adverse event.

Embodiment 51

The method of embodiment 50, wherein the frequency of administration of the maintenance phase dose is increased from a non-daily administration to a daily administration.

Embodiment 52

The method of embodiment 50, wherein the frequency of administration of the maintenance phase dose is increased to an every other day administration of the maintenance phase dose.

Embodiment 53

The method of embodiment 50, wherein the frequency of administration of the maintenance phase dose is increased to a twice weekly administration of the maintenance phase dose.

Embodiment 54

The method of embodiment 50, wherein the frequency of administration of the maintenance phase dose is increased to a once weekly administration of the maintenance phase dose.

Embodiment 55

The method of any one of embodiments 50-54, wherein the maintenance phase dose comprises about 300 mg or more of peanut protein.

Embodiment 56

The method of any one of embodiments 50-55, wherein the maintenance phase dose comprises about 300 mg of peanut protein.

Embodiment 57

The method of any one of embodiments 50-56, wherein the subject is about 12 months old or older.

Embodiment 58

The method of any one of embodiments 50-57, wherein the subject is about 4 years old or older.

Embodiment 59

The method of any one of embodiments 50-58, wherein the subject is between about 4 years old and about 17 years old.

Embodiment 60

The method of any one of embodiments 50-59, further comprising monitoring the subject for an allergic adverse event.

Embodiment 61

A method of increasing tolerance of peanut protein in a subject with a peanut allergy, comprising administering to the subject peanut protein according to an oral immunotherapy schedule comprising an up-dosing phase and a maintenance phase, the maintenance phase comprising administering to the subject a maintenance phase dose for more than 24 weeks.

Embodiment 62

The method of embodiment 61, wherein the maintenance phase dose is administered on a daily basis.

Embodiment 63

The method of embodiment 61 or 62, wherein the maintenance phase dose is administered to the subject for about 28 weeks or more.

Embodiment 64

The method of any one of embodiments 61-63, wherein the maintenance phase dose is administered to the subject for about 52 weeks or more.

Embodiment 65

The method of any one of embodiments 61-64, wherein the maintenance phase dose is administered to the subject for about 52 weeks to about 108 weeks.

Embodiment 66

The method of any one of embodiments 61-65, wherein the subject does not tolerate a dose of about 1000 mg peanut protein after 24 weeks of the maintenance phase.

Embodiment 67

The method of any one of embodiments 61-66, wherein the subject tolerates a dose of about 2000 mg peanut protein at the completion of the maintenance phase.

Embodiment 68

The method of any one of embodiments 61-67, wherein the subject tolerates a cumulative does of about 4043 mg at the completion of the maintenance phase.

Embodiment 69

The method of any one of embodiments 61-68, wherein the maintenance phase dose comprises about 300 mg or more of peanut protein.

Embodiment 70

The method of any one of embodiments 61-69, wherein the maintenance phase dose comprises about 300 mg of peanut protein.

Embodiment 71

The method of any one of embodiments 61-70, wherein the subject is about 12 months old or older.

Embodiment 72

The method of any one of embodiments 61-71, wherein the subject is about 4 years old or older.

Embodiment 73

The method of embodiment 71 or 72, wherein the subject is between about 4 years old and about 17 years old.

Embodiment 74

The method of any one of embodiments 61-73, wherein the up-dosing phase comprises administering to the subject two or more different doses between about 3 mg and about the dose of the initial maintenance phase dose.

Embodiment 75

The method of any one of embodiments 61-74, wherein the up-dosing phase is between about 3 months and about 2 years in length.

Embodiment 76

The method of any one of embodiments 61-75, wherein the oral immunotherapy further comprises an initial escalation phase.

Embodiment 77

A method of treating a subject for a peanut allergy by an oral immunotherapy comprising an up-dosing phase and a maintenance phase, the method comprising: (a) administering to the subject a maintenance phase dose for more than 24 weeks; (b) testing the subject for a highest tolerated peanut protein dose by an oral food challenge; (c) selecting a subject for additional maintenance phase dosing based on the subject tolerating a maximum dose of less than 1,000 mg peanut protein; and (d) continuing to administer to the selected subject the maintenance phase dose.

Embodiment 78

The method of embodiment 77, wherein the maintenance phase dose is administered to the selected subject for at least 4 additional weeks.

Embodiment 79

The method of embodiment 77 or 78, wherein the selecting a subject for additional maintenance phase dosing is further based on the subject tolerating a cumulative dose of less than 4,043 mg of peanut protein.

Embodiment 80

The method of any one of embodiments 77-79, wherein the maintenance phase dose comprises about 300 mg or more of peanut protein.

Embodiment 81

The method of any one of embodiments 77-80, wherein the subject is about 12 months old or older.

Embodiment 82

The method of any one of embodiments 77-81, wherein the subject is about 4 years old or older.

Embodiment 83

The method of any one of embodiments 77-82, wherein the subject is between about 4 years old and about 17 years old.

Embodiment 84

The method of any one of embodiments 77-83, wherein the maintenance phase dose is administered to the selected subject for at least 28 additional weeks.

Embodiment 85

The method of any one of embodiments 77-84, wherein the maintenance phase dose is administered to the selected subject for about 28 additional weeks to about 84 additional weeks.

Embodiment 86

The method of any one of embodiments 77-85, wherein the selected subject tolerates a dose of about 2,000 mg peanut protein at completion of the additional weeks of maintenance phase dosing.

Embodiment 87

The method of any one of embodiments 77-86, wherein the selected subject tolerates a cumulative dose of about 4,043 mg peanut protein at the completion of the additional weeks of maintenance phase dosing.

Embodiment 88

The method of any one of embodiments 77-87, wherein the up-dosing phase comprises administering to the subject two or more different doses between about 3 mg and about the dose of the initial maintenance phase dose.

Embodiment 89

The method of any one of embodiments 77-88, wherein the up-dosing phase is between about 3 months and about 2 years in length.

Embodiment 90

The method of any one of embodiments 77-89, wherein the oral immunotherapy further comprises an initial escalation phase.

EXAMPLES

The application may be better understood by reference to the following non-limiting examples, which are provided as exemplary embodiments of the application. The following examples are presented in order to more fully illustrate embodiments and should in no way be construed, however, as limiting the broad scope of the application. While certain embodiments of the present application have been shown and described herein, it will be obvious that such embodiments are provided by way of example only. Numerous variations, changes, and substitutions may occur to those skilled in the art without departing from the spirit and scope of the invention. It should be understood that various alternatives to the embodiments described herein may be employed in practicing the methods described herein.

Example 1—Maintenance Phase Clinical Trial

A randomized, double-blind, placebo-controlled Phase 3 trial was conducted with peanut-allergic subjects aged 4 to 49 years old. Subjects underwent an initial escalation, followed by an up-dosing phase to a target dose of 300 mg per day of peanut protein, followed by an approximately six-month maintenance phase comprising administration of 300 mg per day of peanut protein. See Jones et al., "*Efficacy and Safety of AR101 in Peanut Allergy: Results from a Phase 3, Randomized, Double-Blind, Placebo-Controlled Trial (PALISADE)*", J. Allergy Clin. Immunol. 141(2), suppl. AB400 (2018); and Vickery et al., *AR101 Oral Immunotherapy for Peanut Allergy*, N. Engl. J. Med., vol. 379, no. 21, pp. 1991-2001 (2018).

An open-label follow-on clinical trial was designed for the subjects of the above clinical trial. Subjects who completed the first trial are randomly divided in three cohorts.

The first cohort receives a maintenance phase dose of about 300 mg peanut protein daily for an additional 28 weeks, for a total of 52 weeks from the start of the maintenance phase in the first clinical trial.

The second cohort receives 300 mg peanut protein every other day for an additional 4 weeks, followed by 300 mg peanut protein twice a week for 24 weeks.

The third cohort is divided in three arms: 3A, 3B, and 3C. In arm 3A, subjects receive 300 mg peanut protein daily for an additional 56 weeks. In arm 3B, subjects receive 300 mg peanut protein daily for 28 weeks, followed by 300 mg peanut protein every other day for 4 weeks, followed by 300 mg peanut protein twice a week for 24 weeks. In arm 3C, subjects receive 300 mg peanut protein daily for 28 weeks, followed by 300 mg peanut protein every other day for 4 weeks, followed by 300 mg peanut protein twice a week for 24 weeks, followed by 300 mg peanut protein weekly for 28 weeks.

All subjects in each cohort who complete their schedule will receive an exit double-blind placebo-controlled food challenge (DBPCFC).

The safety (such as incidence of allergic adverse events) and efficacy (such as highest tolerated dose at exit DBPCFC, measures of serum IgE and IgG4, and reaction to accidental peanut protein ingestion) will be compared between treatment cohorts and arms.

Subject that received a 300 mg peanut protein maintenance phase dose for 52 weeks on a daily basis were challenged using a DBPCFC after approximately 24 weeks of the maintenance phase and again after the approximately 52 weeks (total) of maintenance phase. The DBPCFC included peanut protein doses as listed in Table 1. The DBPCFC after 52 weeks of maintenance phase further included an additional 2000 mg peanut protein dose (4043 mg cumulative peanut protein dose).

TABLE 1

Double-Blind Placebo Controlled Food Challenge

| Peanut Protein in Challenge Dose (mg) | Peanut Flour with 50% Protein Content (mg) | Cumulative Peanut Protein (mg) |
|---|---|---|
| 3 | 6 | 3 |
| 10 | 20 | 13 |
| 30 | 60 | 43 |
| 100 | 200 | 143 |
| 300 | 600 | 443 |
| 600 | 1200 | 1043 |
| 1000 | 2000 | 2043 |

A total of 109 subjects completed the DBPCFC after approximately 24 weeks and approximately 52 weeks of the maintenance phase, wherein daily maintenance phase doses of 300 mg peanut protein were administered to the subject. After the approximately 52 weeks of maintenance phase, 86 subjects (78.9%) tolerated a 1000 mg dose (2043 mg cumulative) of peanut protein during the DBPCFC, and 53 (48.6%) tolerated a 2000 mg dose (4043 mg cumulative) of peanut protein during the DBPCFC (see Table 2). Adverse events, regardless of causality, were similar during both the portions of the maintenance phase (87.1% during the initial 24 week period, and 82.9% during the subsequent 28 week period). Four subjects (3.4%) discontinued treatment during the subsequent maintenance phase due to adverse events, three of which were treatment related (1 eosinophilic esophagitis, 2 systemic allergic reactions). After the subsequent 28 week period, the median (Q1, Q3) tolerated dose during the DBPCFC was 1000 mg (1000 mg 2000 mg), the same as after the initial 24 week maintenance period. However, subjects that tolerated less than 1000 mg after the initial week maintenance period (n=39, median (Q1, Q3) was 600 mg (300 mg, 600 mg), 69.2% (n=27) tolerated a higher challenge dose after the subsequent 28 week additional maintenance phase (median (Q1, Q3) was 1000 mg (1000 mg, 2000 mg)). The median (Q1, Q3) tolerated of those 27 subjects after the initial 24 week maintenance period was 600 mg (300 mg, 600 mg), and increased to 1000 mg (1000 mg, 2000 mg) after the subsequent 28 week additional maintenance phase. Immunological changes continued to occur during the subsequent 28 week additional maintenance phase, including skin prick test median (Q1, Q3) wheal diameter (7.5 mm (6.0 mm, 10.0 mm) after the initial 24 week maintenance phase versus 7.0 mm (6.0 mm, 9.0 mm) after the subsequent 28 week additional maintenance phase), median (Q1, Q3) peanut-specific IgE (psIgE) level (58 kU/L (19.8 kU/L, 225.3 kU/L after the initial 24 week maintenance phase versus 38.5 kU/L (14.4 kU/L, 97.4 kU/L) after the subsequent 28 week additional maintenance phase), and median Q1, Q3) psIgE/psIgG4 ratio (11.2 (2.7, 29.9) after the initial 24 week maintenance phase versus 5.5 (1.1, 14.9) after the subsequent 28 week additional maintenance phase.

TABLE 2

Tolerated Doses During DBPCFC (n = 109)

| Challenge Dose | After 24 Week Maintenance Phase (%) | After 52 Week Maintenance Phase (%) |
|---|---|---|
| 300 mg | 100 | 98.2 |
| 443 mg (cumulative) | | |
| 600 mg | 87.2 | 89.9 |
| 1043 mg (cumulative) | | |
| 1000 mg | 64.2 | 78.9 |
| 2043 mg (cumulative) | | |
| 2000 mg | Not Tested | 48.6 |
| 4043 mg (cumulative) | | |

Example 2—Real-World Evidence of Non-Daily Maintenance Protection

A 6-year-old peanut-allergic child subject participated in the phase 3 clinical trial and cohort 2 of the follow-on trial described in Example 1 for peanut allergy desensitization. The subject received an investigational peanut protein drug formulation for a total of 18 months. In the phase 3 trial, he completed about six months of escalating doses (i.e., the up-dosing phase) to reach a maintenance phase dose of 300 mg peanut protein per day. The subject received the maintenance phase dose of 300 mg daily for six more months (i.e., the maintenance phase). Desensitization after the first maintenance phase portion was demonstrated post-treatment by a double-blind, placebo-controlled oral food challenge (DBPCFC), wherein the subject tolerated a highest dose of 1,000 mg (2,043 mg cumulative) of peanut protein. Following exit from the phase 3 trial, the subject entered the follow-on trial, where the dosing frequency was reduced from daily to every other day for one month, then to twice a week for over five months before the incident described below. With the exception of the clinical exposure to peanut protein, the subject's family rigorously guarded the subject from non-clinical exposure to peanut protein.

The subject's peanut allergy was diagnosed at age one year. Upon his first known exposure to peanut butter, he experienced immediate, moderate anaphylaxis, including symptoms of facial flushing, severe facial edema, widespread urticaria on his face, neck and scalp, severe rhinorrhea, and wheezing. The subject had laboratory evidence of peanut sensitivity with skin prick test wheal size of 20 mm and peanut-specific IgE of 4.68 ku/L. The subject has no other known food allergies. The subject's guardians have educated him on peanut avoidance and supervised his potential exposure to peanut protein, for example, by sorting Halloween candy. The subject's guardians reported that the subject, to their knowledge, had never accidentally ingested any peanut protein prior to the incident described below.

The subject attends a nut-free suburban public school program and an aftercare program. His peanut allergy is documented with the programs and known by staff. The aftercare program typically provides nut-free snacks, such as popcorn, crackers, or fruit, and occasionally treats, such as popsicles or ice cream.

The subject's father arrived one day to pick him up from the aftercare program and found him holding an empty box of caramel-coated popcorn and peanuts sold under the trademark CRACKER JACK®, which the subject disclosed he had just finished eating. The subject was not familiar with the food product, and was unaware it contained peanuts.

Given the subject's history of anaphylaxis and the life-threatening nature of peanut allergy generally, the subject's guardians monitored him at home for the development of symptoms, with nearby epinephrine for intervention. The subject's guardians further contacted a study-affiliated allergist, who approved of their at-home monitoring in view of the access to epinephrine and proximity to an emergency center.

The subject's activity was restricted for the evening and he skipped his usual twice a week dose of the experimental pharmaceutical peanut protein composition. The next morning, after sleeping, the subject remained asymptomatic. He attended school and his aftercare program.

In this example, it is demonstrated that a subject with a history of anaphylactic reaction to peanut protein was desensitized by peanut oral immunotherapy. Further, that desensitized state was maintained over months of non-daily (i.e., less than daily, maintenance phase dosing). Specifically, the subject described in this example received over five months of non-daily maintenance dosing, and yet was still non-reactive after accidentally consuming dietary peanuts.

What is claimed is:

1. A method of treating a subject for a peanut allergy by an oral immunotherapy comprising an up-dosing phase and a maintenance phase, the method comprising:
    (a) administering to the subject the up-dosing phase;
    (b) administering to the subject a maintenance phase dose for more than 24 weeks;
    (c) testing the subject for a highest tolerated peanut protein dose by an oral food challenge;
    (d) selecting a subject for additional maintenance phase dosing based on the subject tolerating a maximum dose of less than 1,000 mg peanut protein; and
    (e) continuing to administer to the selected subject the maintenance phase dose; wherein the maintenance phase dose comprises 300 mg of peanut protein.

2. The method of claim 1, wherein the maintenance phase dose is administered to the selected subject for at least 4 additional weeks.

3. The method of claim 1, wherein the selecting a subject for additional maintenance phase dosing is further based on the subject tolerating a cumulative dose of less than 4,043 mg of peanut protein.

4. The method of claim 1, wherein the maintenance phase dose comprises 300 mg or more of peanut protein.

5. The method of claim 1, wherein the subject is 12 months old or older.

6. The method of claim 1, wherein the subject is 4 years old or older.

7. The method of claim 1, wherein the subject is between 4 years old and 17 years old.

8. The method of claim 1, wherein the maintenance phase dose is administered to the selected subject for at least 28 additional weeks.

9. The method of claim 1, wherein the maintenance phase dose is administered to the selected subject for 28 additional weeks to 84 additional weeks.

10. The method of claim 1, wherein the selected subject tolerates a dose of 2,000 mg peanut protein at completion of the additional weeks of maintenance phase dosing.

11. The method of claim 1, wherein the selected subject tolerates a cumulative dose of 4,043 mg peanut protein at the completion of the additional weeks of maintenance phase dosing.

12. The method of claim 1, wherein the up-dosing phase comprises administering to the subject two or more different doses between 3 mg and the dose of the initial maintenance phase dose.

13. The method of claim 1, wherein the up-dosing phase is between 3 months and 2 years in length.

14. The method of claim 1, wherein the oral immunotherapy further comprises an initial escalation phase.

* * * * *